(12) United States Patent
Gorokhov et al.

(10) Patent No.: US 9,088,389 B2
(45) Date of Patent: Jul. 21, 2015

(54) REVERSE LINK PILOT TRANSMISSION FOR A WIRELESS COMMUNICATION SYSTEM

(75) Inventors: Alexei Gorokhov, San Diego, CA (US); Aamod Khandekar, San Diego, CA (US); Tamer Kadous, San Diego, CA (US); Mohammad J. Borran, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1031 days.

(21) Appl. No.: 11/761,798

(22) Filed: Jun. 12, 2007

(65) Prior Publication Data
US 2008/0019314 A1  Jan. 24, 2008

Related U.S. Application Data

(60) Provisional application No. 60/813,535, filed on Jun. 13, 2006.

(51) Int. Cl.
*H04W 4/00* (2009.01)
*H04B 7/216* (2006.01)
(Continued)

(52) U.S. Cl.
CPC ............ *H04L 5/0016* (2013.01); *H04B 1/7075* (2013.01); *H04L 5/0053* (2013.01);
(Continued)

(58) Field of Classification Search
CPC .. H04B 1/692; H04B 1/7075; H04B 25/0026; H04B 25/03866; H04B 27/2613; H04B 27/2657; H04B 27/2607; H04B 25/0228
USPC .................. 370/330, 203, 335, 329, 267, 208
See application file for complete search history.

(56) References Cited

U.S. PATENT DOCUMENTS

| | | |
|---|---|---|
| 2004/0001429 A1 | 1/2004 | Ma et al. |
| 2004/0023634 A1* | 2/2004 | Jeong et al. ............. 455/403 |

(Continued)

FOREIGN PATENT DOCUMENTS

| | | |
|---|---|---|
| JP | 2005102210 A | 4/2005 |
| JP | 2005204321 A | 7/2005 |

(Continued)

OTHER PUBLICATIONS

International Search Report, PCT/US07/070985—International Search Authority European Patent Office, Dec. 14, 2007.

(Continued)

*Primary Examiner* — Opiribo Georgewill
(74) *Attorney, Agent, or Firm* — Peng Zhu

(57) ABSTRACT

Techniques to transmit pilot on a CDMA segment on the reverse link in a wireless communication system are described. A terminal generates a scrambling sequence based on its pilot information. The pilot information may be used for the entire duration of a call by the terminal and for all sectors with which the terminal communicates during the call. The terminal generates pilot symbols based on the scrambling sequence, maps the pilot symbols to the CDMA segment, generates OFDM symbols with the mapped pilot symbols, and sends the OFDM symbols to one or more sectors. A base station processes received OFDM symbols to obtain received symbols for the CDMA segment. The base station generates the scrambling sequence based on the pilot information for the terminal and processes the received symbols with the scrambling sequence to obtain at least one parameter (e.g., received signal strength) for the terminal.

46 Claims, 14 Drawing Sheets

(51) Int. Cl.
*H04L 12/16* (2006.01)
*H04J 11/00* (2006.01)
*H04L 5/00* (2006.01)
*H04B 1/7075* (2011.01)
*H04L 25/03* (2006.01)
H04L 25/02 (2006.01)
H04L 27/26 (2006.01)

(52) U.S. Cl.
CPC ......... *H04L25/03866* (2013.01); *H04L 5/0026* (2013.01); *H04L 25/0226* (2013.01); *H04L 27/2613* (2013.01); *H04L 27/2657* (2013.01)

(56) References Cited

U.S. PATENT DOCUMENTS

| | | | |
|---|---|---|---|
| 2004/0081123 A1* | 4/2004 | Krishnan et al. | 370/329 |
| 2004/0082356 A1* | 4/2004 | Walton et al. | 455/522 |
| 2004/0085892 A1* | 5/2004 | Walton et al. | 370/208 |
| 2004/0223472 A1* | 11/2004 | Sankaran et al. | 370/335 |
| 2004/0228267 A1* | 11/2004 | Agrawal et al. | 370/203 |
| 2005/0047515 A1* | 3/2005 | Walton et al. | 375/267 |
| 2005/0084000 A1 | 4/2005 | Krauss et al. | |
| 2005/0094615 A1 | 5/2005 | Kim et al. | |
| 2007/0153876 A1* | 7/2007 | Pi et al. | 375/140 |
| 2008/0080432 A1* | 4/2008 | Lu et al. | 370/335 |

FOREIGN PATENT DOCUMENTS

| | | |
|---|---|---|
| JP | 2005323382 A | 11/2005 |
| JP | 2005537691 A | 12/2005 |
| RU | 2154901 | 8/2000 |
| RU | 2207723 C1 | 6/2003 |
| WO | 03034645 | 4/2003 |
| WO | WO2004080020 A2 | 9/2004 |
| WO | 2004102816 A2 | 11/2004 |
| WO | WO2005015797 | 2/2005 |
| WO | WO2005041452 A1 | 5/2005 |
| WO | WO2005086440 A1 | 9/2005 |
| WO | 2007051187 | 5/2007 |

OTHER PUBLICATIONS

C30-20060327-023, "QUALCOMM Proposal for 3GPP2 Air Interface Evolution Phase 2", Dallas, TX, Mar. 2006.
C.S0024-B, "cdma2000 High Rate Packet Data Air Interface Specification", May 2006.
C.S0054-A, "cdma2000 High Rate Broadcast—Multicast Packet Data Air Interface Specification", Mar. 2006.
NTT Docomo et al., "Physical Channels and Multiplexing in Evolved UTRA Uplink", 3GPP Draft, R1-050850 Uplink Physical Channel Multiplexing, 3rd Generation Partnership Profject (3GPP), Mobile Competence Centre, 650, Route Des Lucioles, F-06921 Sophia-Antipolis Cedex, France, vol. RAN WGI, No. London, UK, 20050825, Aug. 25, 2005, XP050100479.
Ritt, "Pilot design for E-UTRA uplink", 3GPP TSG-RAN WG1 #44-bis Meeting R1-060972, Mar. 31, 2006.
Siemens, "Pilots for E-UTRA", 3GPP TSG RAN WG1 #42 R1-050773, Sep. 2, 2005.
Taiwan Search Report—TW096121353—TIPO—Jun. 1, 2011.
Written Opinion—PCT/US2007/070985, International Search Authority, European Patent Office, Dec. 14, 2007.
Tomcik J, "QFDD and QTDD: Proposed Draft Air Interface Specificastion", IEEE C802.20-05/69,Oct. 28, 2005, pp. 624, P.6-102,7-82-83,96,9-61-63,65,71,77,82,-84.

* cited by examiner

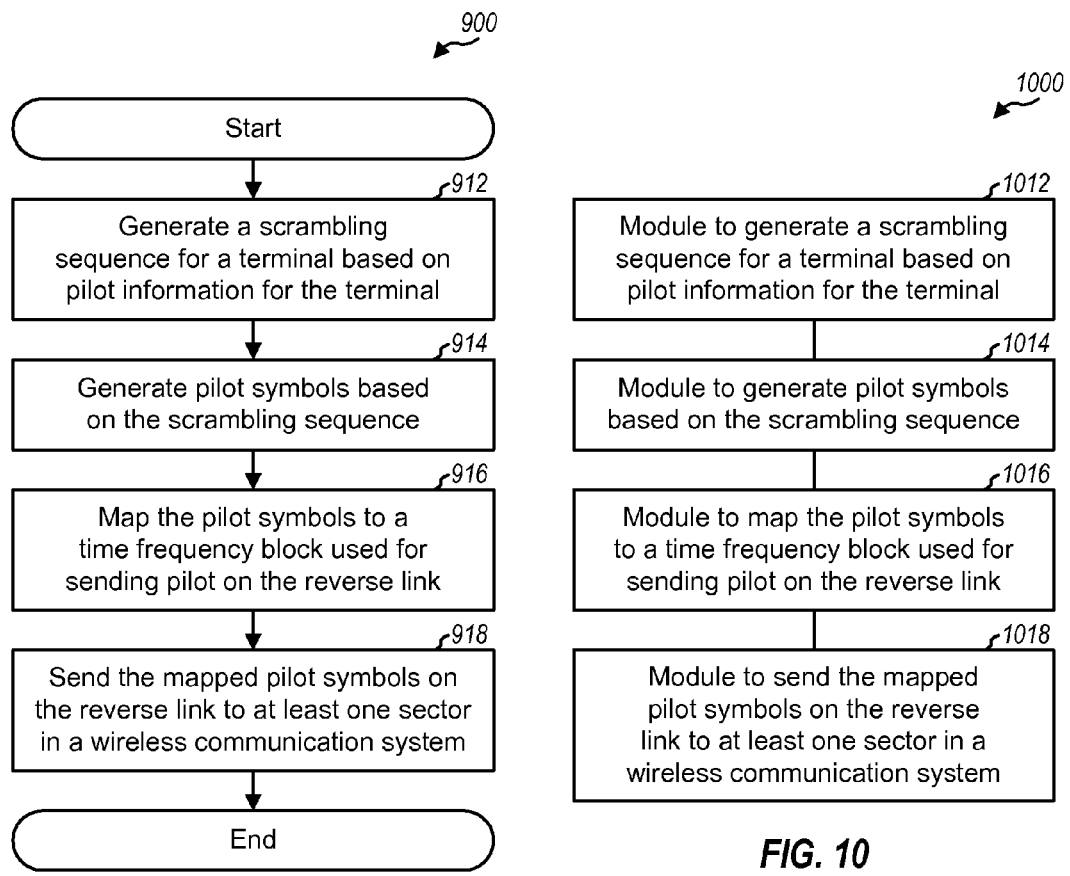

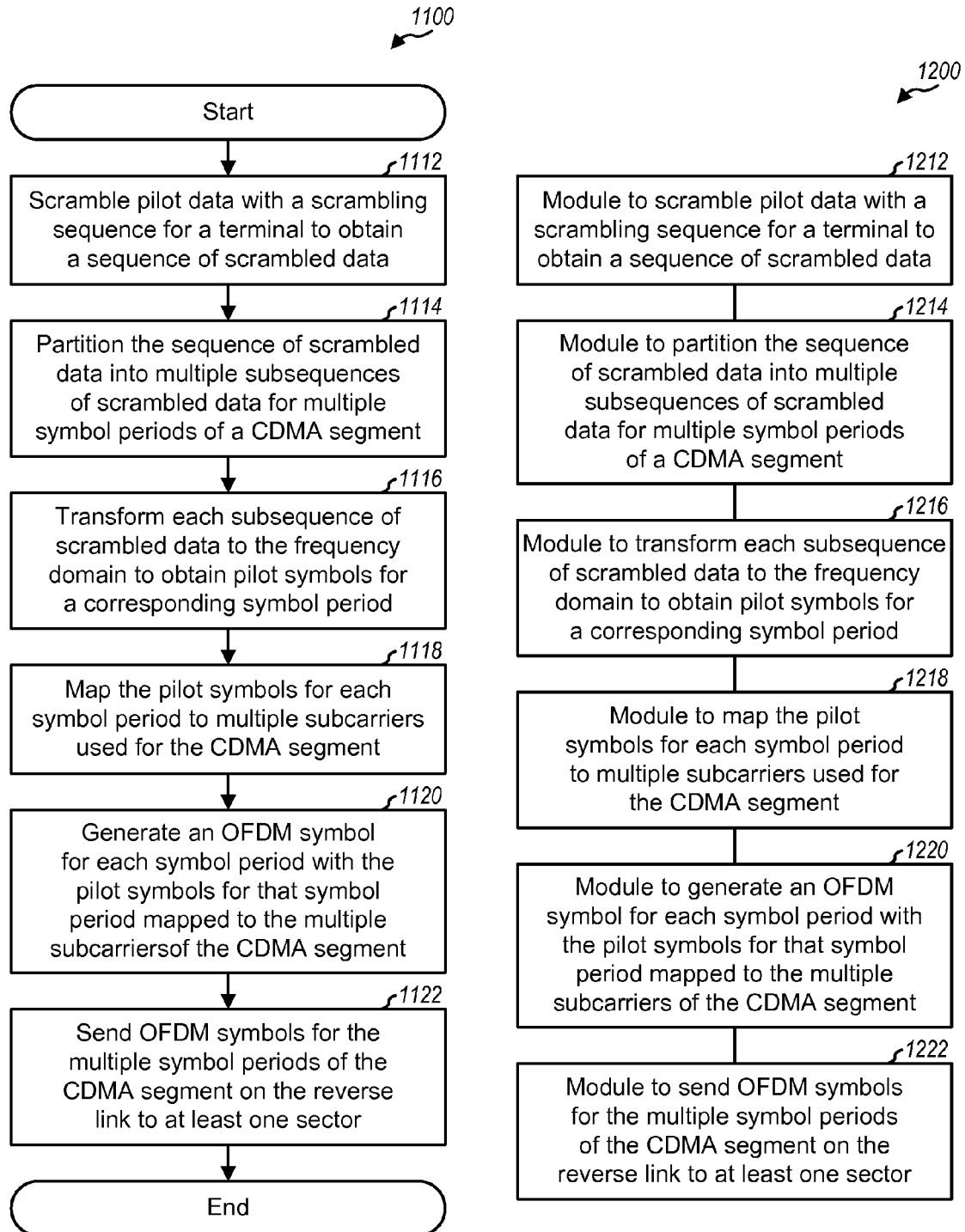

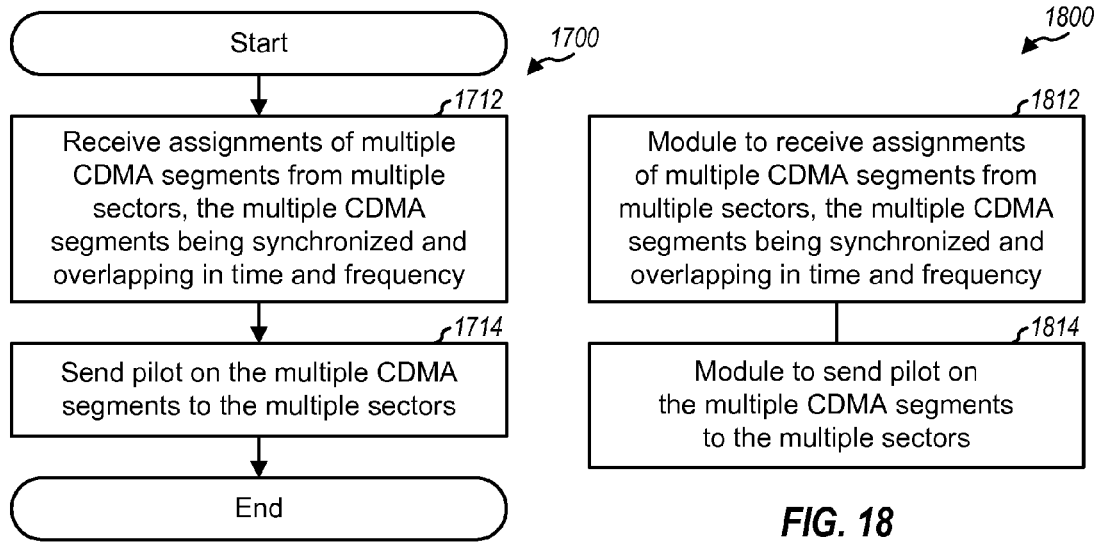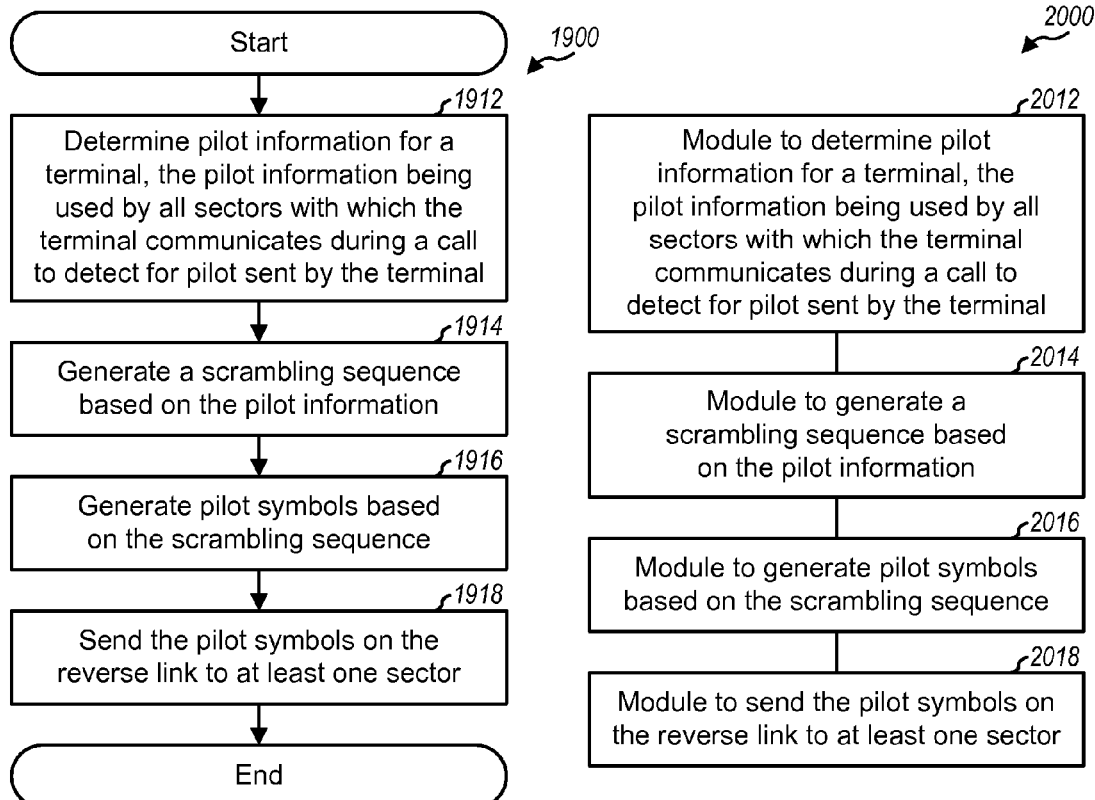

REVERSE LINK PILOT TRANSMISSION FOR A WIRELESS COMMUNICATION SYSTEM

The present application claims priority to provisional U.S. application Ser. No. 60/813,535, entitled "REVERSE LINK PILOT TRANSMISSION FOR WIRELESS COMMUNICATION SYSTEMS," filed Jun. 13, 2006, assigned to the assignee hereof and incorporated herein by reference.

BACKGROUND

I. Field

The present disclosure relates generally to communication, and more specifically to pilot transmission in a wireless communication system.

II. Background

Wireless communication systems are widely deployed to provide various communication services such as voice, video, packet data, messaging, broadcast, etc. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include many base stations that support communication for many terminals on the forward and reverse links. The forward link (or downlink) refers to the communication link from the base stations to the terminals, and the reverse link (or uplink) refers to the communication link from the terminals to the base stations. The terminals may be located anywhere within the system, and each terminal may be within the coverage of zero, one, or multiple base stations at any given moment. Each terminal may transmit pilot on the reverse link to allow the base stations to detect the terminal and assign the terminal to an appropriate base station that can efficiently serve the terminal and/or for other purposes. The pilots transmitted by the terminals, although useful, represent overhead.

There is therefore a need in the art for techniques to efficiently transmit pilot on the reverse link.

SUMMARY

Techniques to efficiently transmit pilot on the reverse link in a wireless communication system are described herein. A CDMA segment may be used to support transmission of pilot and signaling by terminals using CDMA on the reverse link. The CDMA segment may occupy a time frequency block that is a portion of the time and frequency resources available for transmission on the reverse link.

In one design, a terminal may generate a scrambling sequence based on pilot information for the terminal. The pilot information may be used for the entire duration of a call by the terminal and for all sectors with which the terminal communicates during the call. The pilot information may comprise an identifier of the terminal, an identifier of a sector with which the terminal communicates in order to access the system, a system access time for the terminal, etc. The terminal may generate pilot symbols based on the scrambling sequence, e.g., by scrambling pilot data with the scrambling sequence and mapping the scrambled data to pilot symbols. The terminal may then map the pilot symbols to the time frequency block for the CDMA segment. If the system uses OFDM on the reverse link, then the terminal may generate OFDM symbols with the mapped pilot symbols and transmit the OFDM symbols on the reverse link to one or more sectors.

In one design, a base station for a sector may process received OFDM symbols to obtain received symbols for the CDMA segment. The base station may generate the scrambling sequence for the terminal based on the pilot information and may process the received symbols based on the scrambling sequence to obtain at least one parameter for the terminal. The base station may transform the received symbols for the CDMA segment to the time domain to obtain a sequence of input samples, descramble the sequence of input samples with the scrambling sequence to obtain a descrambled sequence, and correlate the descrambled sequence with the pilot data to obtain correlation result for a channel tap. The base station may repeat the processing for multiple channel taps and determine received signal strength and/or other parameters for the terminal based on the correlation results for the multiple channel taps.

The pilot sent on the CDMA segment may be used for various purposes, as described below. Various aspects and features of the disclosure are also described in further detail below.

BRIEF DESCRIPTION OF THE DRAWINGS

FIGS. 9 and 11 show processes to transmit pilot on the reverse link.

FIGS. 10 and 12 show apparatuses to transmit pilot on the reverse link.

FIGS. 17 and 19 show processes to transmit pilot on the reverse link.

FIGS. 18 and 20 show apparatuses to transmit pilot on the reverse link.

DETAILED DESCRIPTION

Figure 1:
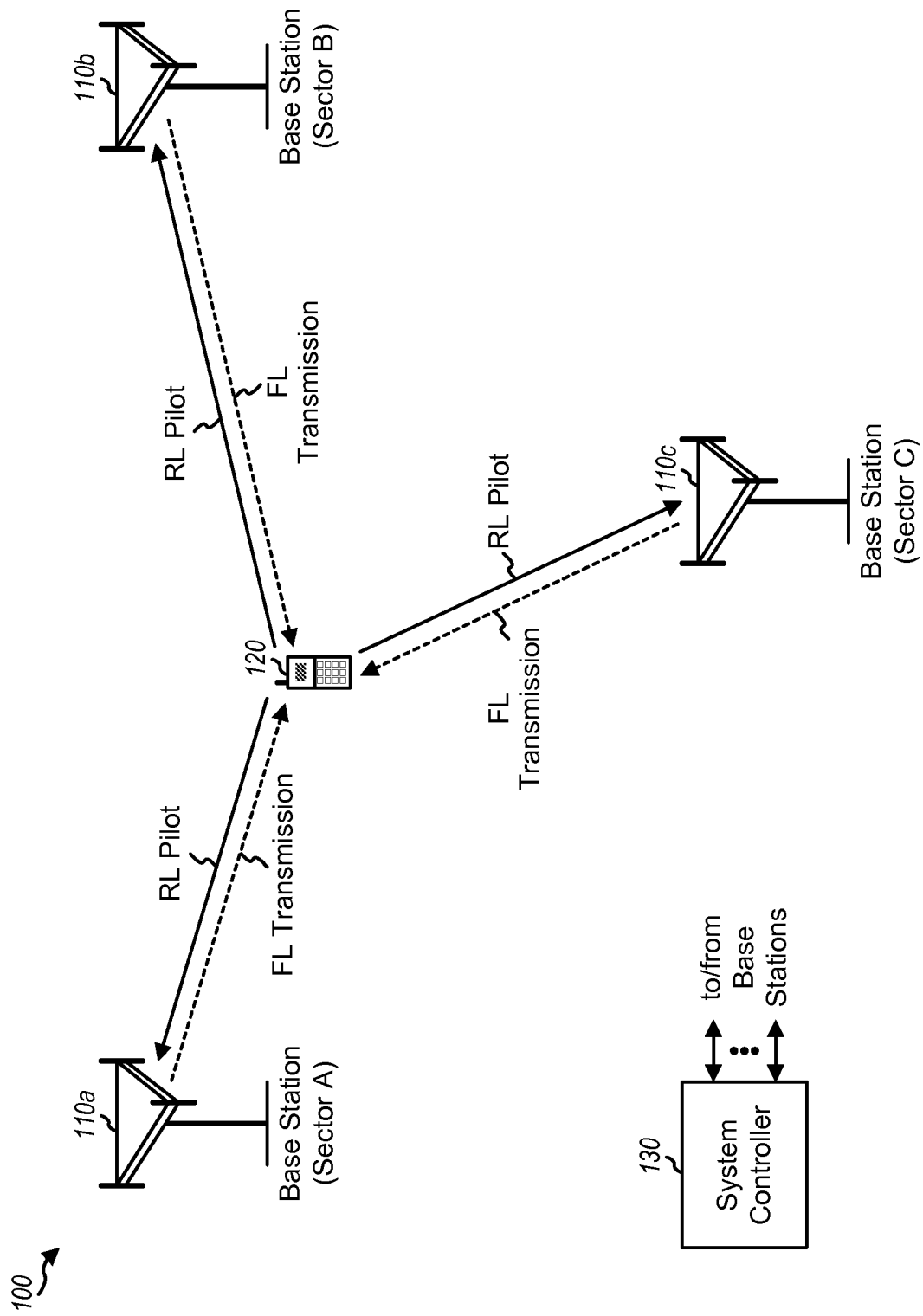
FIG. 1 shows a wireless communication system.

FIG. 1 shows a wireless communication system 100 with multiple base stations. For simplicity, only three base stations 110a, 110b and 110c are shown in FIG. 1. A base station is a station that communicates with the terminals. A base station may also be called, and may contain some or all of the functionality of, an access point, a Node B, an evolved Node B, etc. Each base station provides communication coverage for a particular geographic area. The term "cell" can refer to a base station and/or its coverage area depending on the context in which the term is used. To improve system capacity, a base station coverage area may be partitioned into multiple (e.g., three) smaller areas. Each smaller area may be served by a respective base transceiver station (BTS). The term "sector" can refer to a BTS and/or its coverage area depending on the context in which the term is used. For a sectorized cell, the BTSs for all sectors of that cell are typically co-located within the base station for the cell.

The techniques described herein may be used for systems with sectorized cells as well as systems with unsectorized cells. For clarity, the techniques are described below for a system with sectorized cells. The terms "base station" and "sector" are used interchangeably herein. Base stations 110a, 110b and 110c are also referred to as sectors A, B and C, respectively.

Many terminals may be dispersed throughout system 100, and each terminal may be stationary or mobile. For simplicity, only one terminal 120 is shown in FIG. 1. Terminal 120 may also be called, and may contain some or all of the functionality of, an access terminal, a mobile station, a user equipment, a subscriber unit, a station, etc. Terminal 120 may be a cellular phone, a personal digital assistant (PDA), a wireless device, a wireless modem, a handheld device, a laptop computer, etc. Terminal 120 may communicate with zero, one, or multiple base stations on the forward link (FL) and/or the reverse link (RL) at any given moment. FIG. 1 shows terminal 120 transmitting pilot on the reverse link to base stations 110a, 110b and 110c and receiving transmissions on the forward link from these base stations.

For a centralized architecture, a system controller 130 may couple to base stations 110 and provide coordination and control for these base stations. System controller 130 may be a single network entity or a collection of network entities. For a distributed architecture, the base stations may communicate with one another as needed.

The techniques described herein may be used for various wireless communication systems such as CDMA, TDMA, FDMA, OFDMA and SC-FDMA systems. A CDMA system utilizes code division multiplexing (CDM), and transmissions are sent with different orthogonal codes, pseudo-random sequences, etc. A TDMA system utilizes time division multiplexing (TDM), and transmissions are sent in different time slots. An FDMA system utilizes frequency division multiplexing (FDM), and transmissions are sent on different subcarriers. An OFDMA system utilizes orthogonal frequency division multiplexing (OFDM), and an SC-FDMA system utilizes single-carrier frequency division multiplexing (SC-FDM). OFDM and SC-FDM partition the system bandwidth into multiple orthogonal subcarriers, which are also referred to as tones, bins, etc. Each subcarrier may be modulated with data. In general, modulation symbols are sent in the frequency domain with OFDM and in the time domain with SC-FDM. The techniques may also be used for wireless communication systems that utilize a combination of multiplexing schemes, e.g., CDM and OFDM, OFDM and SC-FDM, etc. For clarity, certain aspects of the techniques are described below for a system that utilizes CDM and OFDM on the reverse link.

Figure 2:
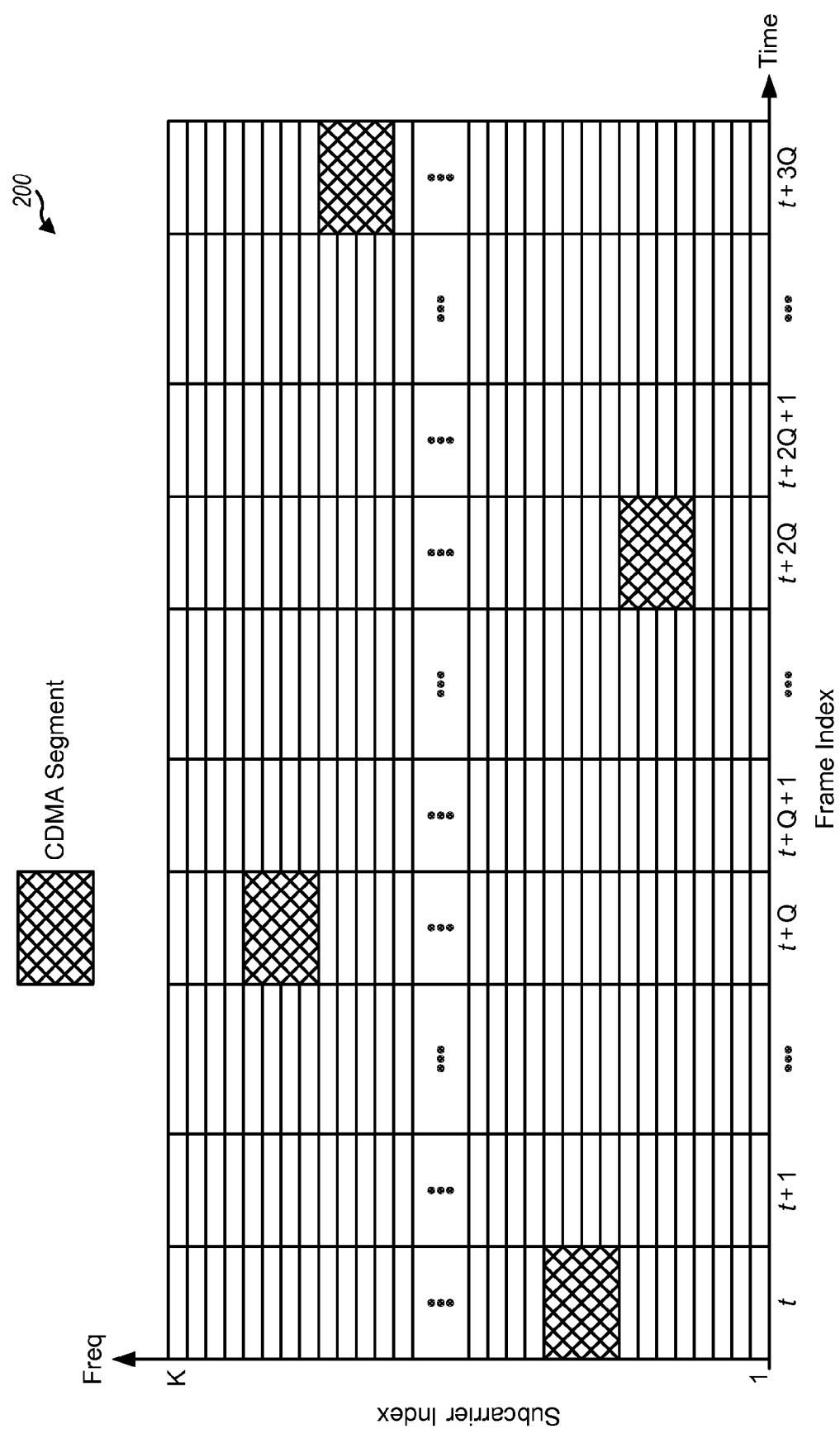
FIG. 2 shows transmission of the CDMA segment on the reverse link.

FIG. 2 shows a design of a frame structure 200 that may be used for the reverse link. The transmission timeline may be partitioned into frames, which may also be referred to as physical layer (PHY) frames, time slots, etc. The frames may be assigned sequential indices, as shown in FIG. 2. Each frame may span a particular time duration, which may be fixed or configurable. In one design, each frame spans N symbol periods, where in general N≥1 and in one example N=8.

FIG. 2 also shows a subcarrier structure. The system bandwidth may be partitioned into multiple (K) orthogonal subcarriers that may be assigned indices of 1 through K. In a spectrally shaped system, only a subset of the K total subcarriers may be used for transmission, and the remaining subcarriers may serve as guard subcarriers to allow the system to meet spectral mask requirements. For simplicity, the following description assumes that all K total subcarriers are usable.

FIG. 2 also shows a design of a CDMA segment that may support transmission of pilot and signaling on the reverse link. The CDMA segment may also be referred to as a CDM control segment, a control segment, a control block, etc. The CDMA segment may occupy a block of time and frequency resources and may support pilot and signaling channels such as, e.g., a pilot channel (PICH), a channel quality indicator channel (CQICH), a request channel (REQCH), a beamforming feedback channel (BFCH), a subband feedback channel (SFCH), an access channel (ACH), etc. In the design shown in FIG. 2, the CDMA segment is sent in every Q frames, where in general Q≥1 and as some examples Q=4, 6, 8, etc. The CDMA segment may hop across the system bandwidth from CDMA frame to CDMA frame (as shown in FIG. 2) or may be sent on a fixed set of subcarriers (not shown in FIG. 2). A CDMA frame is a frame in which the CDMA segment is sent. In general, the CDMA segment may be sent at any rate and in a time frequency block of any dimension. The terminals may share the CDMA segment for pilot, signaling, etc. This may be more efficient than assigning dedicated time frequency resources to each terminal for sending pilot and signaling on the reverse link, especially when pilot and/or signaling may be sent sporadically.

In general, the CDMA segment may cover any number of subcarriers and span any number of frames. The CDMA segment may have a fixed or configurable dimension, which may be selected based on various factors such as the amount of pilot and signaling being sent on the reverse link, the amount of overhead to allocate for the CDMA segment, etc.

Figure 3A:
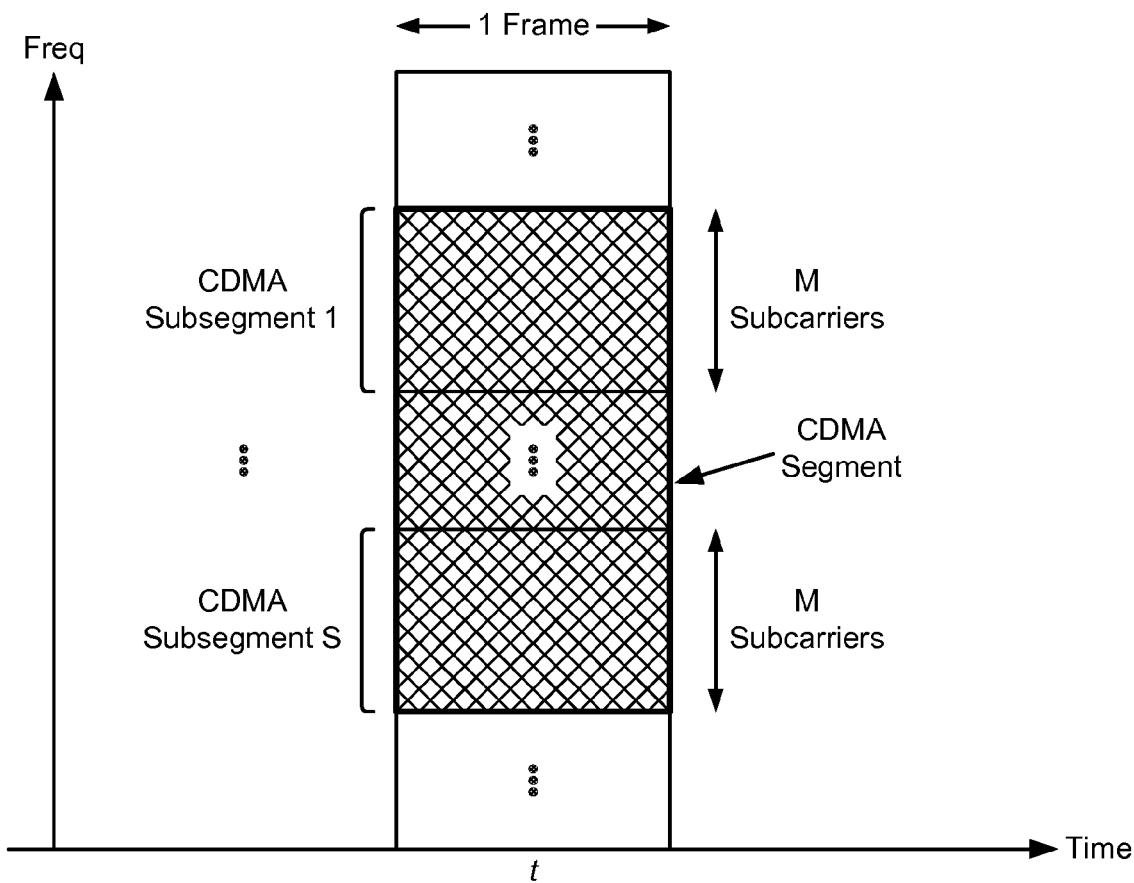
FIGS. 3A and 3B show two designs of the CDMA segment.

FIG. 3A shows a design of the CDMA segment. In this design, the CDMA segment includes S CDMA subsegments 1 through S, where in general S≥1. In this design, the size of the CDMA segment may be varied in coarse increments of one CDMA subsegment, e.g., based on the amount of pilot and signaling sent on the reverse link. Each CDMA subsegment may cover M contiguous subcarriers in one frame of N symbol periods and may have a dimension of M×N.

The S CDMA subsegments may occupy consecutive subcarriers, as shown in FIG. 3A. Alternatively, the S CDMA subsegments may be spread across the system bandwidth. For example, the system bandwidth may be partitioned into multiple subbands. Each CDMA subsegment may be sent on a different subband and may cover all or a portion of the subband.

Figure 3B:
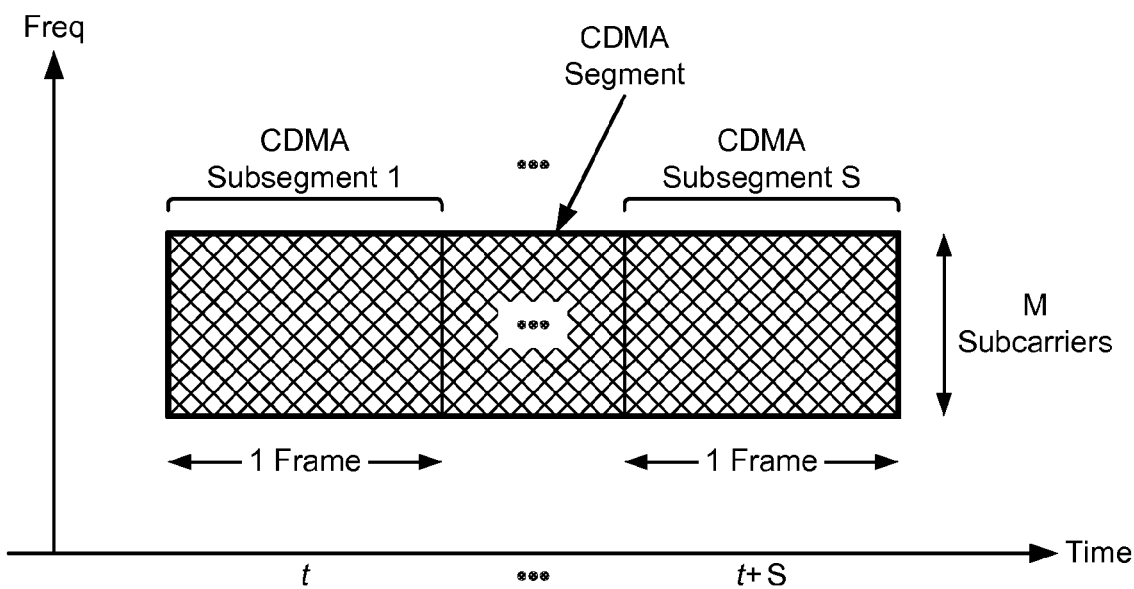

FIG. 3B shows another design of the CDMA segment. In this design, the CDMA segment includes S CDMA subsegments 1 through S, with each CDMA subsegment covering M contiguous subcarriers in a different frame.

In the designs shown in FIGS. 3A and 3B, a CDMA subsegment covers M contiguous subcarriers. In another design, a CDMA subsegment includes multiple subcarrier clusters that may be distributed across the system bandwidth. Each cluster may include a set of contiguous subcarriers. For example, a CDMA subsegment may include two clusters, with each cluster having M/2 contiguous subcarriers. The subcarriers in a CDMA subsegment may also be distributed across frequency in other manners.

In general, the CDMA segment for a given sector may include any number of CDMA subsegments, which may be spread across frequency as shown in FIG. 3A, or across time as shown in FIG. 3B, or across both frequency and time. Furthermore, the same or different numbers of CDMA subsegments may be used for different frames. The CDMA subsegments may be assigned indices and may be identified based on their indices. Different sectors may have CDMA segments of the same size or different sizes.

Terminal 120 may be assigned one or more CDMA subsegments by one or more sectors at any given moment. For example, terminal may be assigned a CDMA subsegment by each sector that is communicating with terminal 120, by each sector that has detected terminal 120 with sufficient signal strength, by each sector to which terminal 120 may be handed over, etc. Each sector may assign terminal 120 with one or more CDMA subsegments in the CDMA segment for that sector.

In one design, terminal 120 may be assigned a CDMA subsegment by a sector with which terminal 120 communicates to access the system. This sector may be the first serving sector for terminal 120. Subsequently, terminal 120 may be assigned a CDMA subsegment by each sector that is added to an active set of terminal 120 and may be de-assigned a CDMA subsegment by each sector that is removed from the active set. The active set for terminal 120 may include all sectors with which terminal 120 communicates. Terminal 120 may thus be assigned CDMA subsegments by any number of sectors at any given moment.

In general, the sectors in system 100 may be synchronous or asynchronous. For a synchronous system, the sectors have the same timing, and the frames of the sectors may be time aligned. For an asynchronous system, the timing of one sector may be pseudo-random with respect to the timing of other sectors, and the frames of different sectors may not be time aligned.

Figure 4:
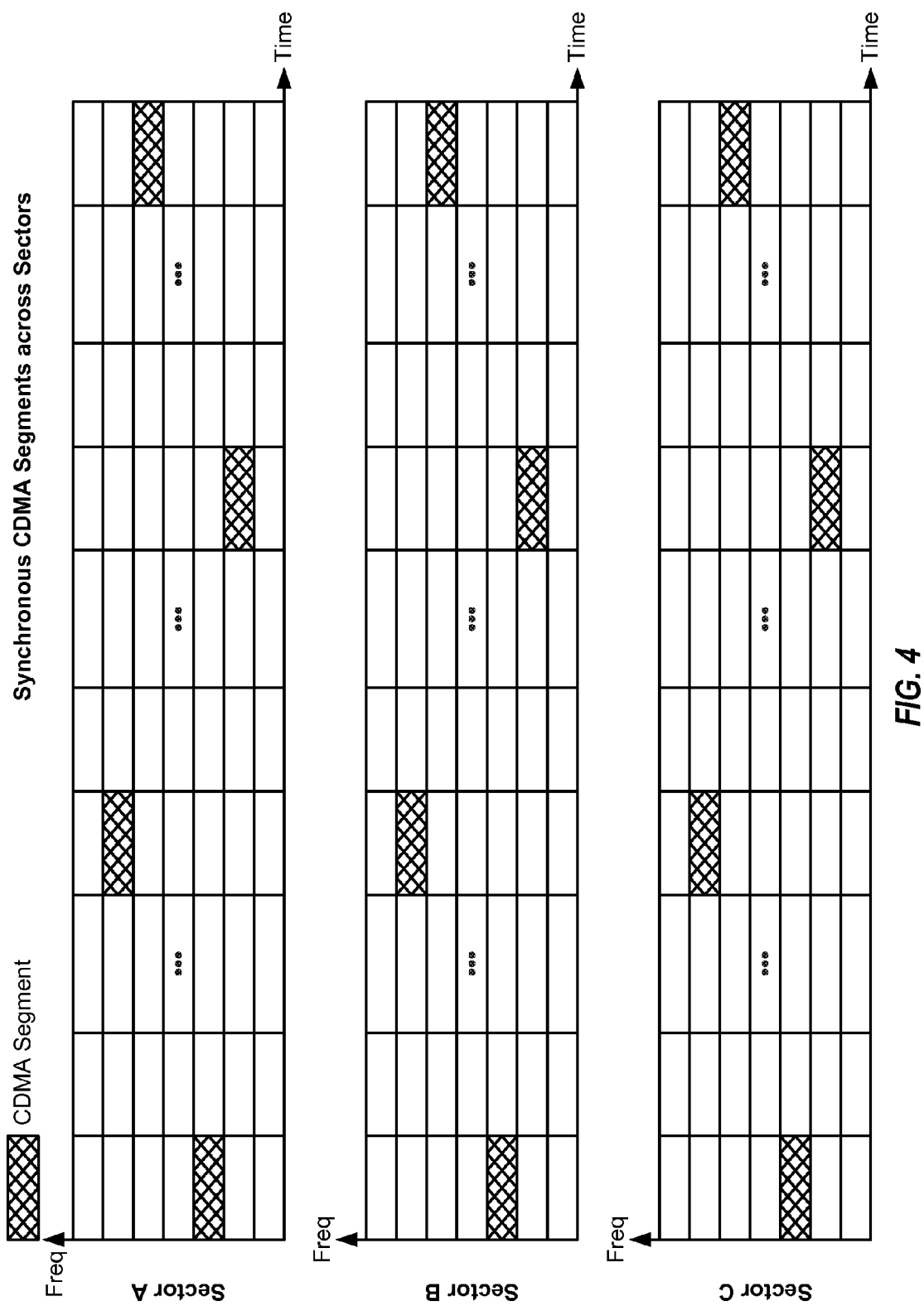
FIG. 4 shows synchronous CDMA segments across three sectors.

FIG. 4 shows synchronous CDMA segments across three sectors A, B and C. The CDMA segments for sectors A, B and C may overlap in time and frequency and may hop based on a common frequency hopping sequence. Terminal 120 may be assigned the same CDMA subsegment by all three sectors A, B and C, which may be in the active set of terminal 120. In this case, terminal 120 may send pilot and signaling on the same CDMA subsegment to all three sectors A, B and C, which may reduce interference on the reverse link.

In general, terminal 120 may send pilot and signaling on each CDMA subsegment that is assigned to the terminal. If terminal 120 is assigned non-overlapping CDMA subsegments by multiple sectors (in either a synchronous or asynchronous system), then terminal 120 may send the same pilot and signaling on each of the assigned CDMA subsegments. If terminal 120 is assigned non-overlapping CDMA subsegments in a synchronous system, then each sector may obtain more pilot measurements for terminal 120.

Figure 5:
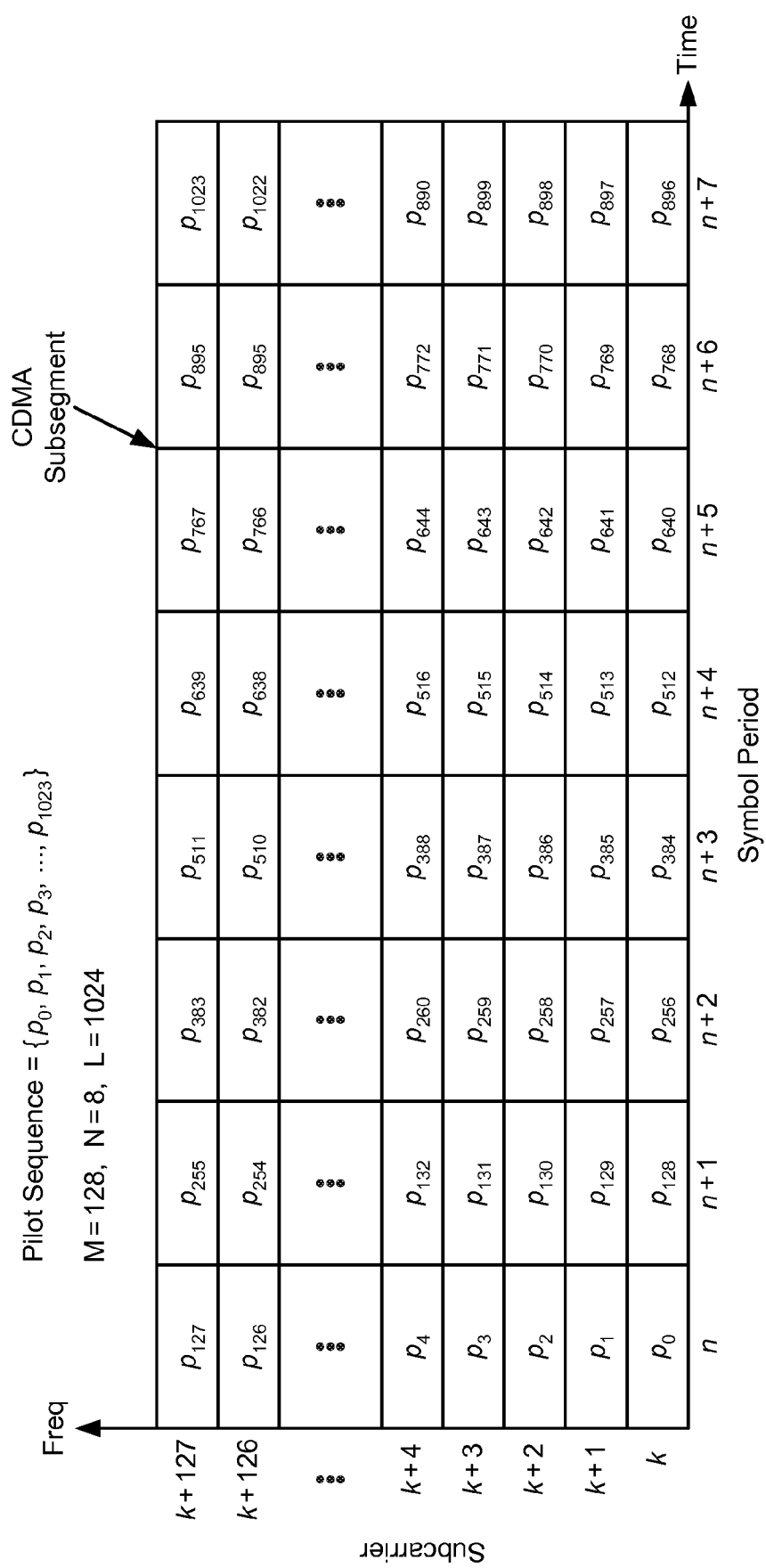
FIG. 5 shows transmission of pilot on the CDMA segment.

FIG. 5 shows a design of pilot transmission on a CDMA subsegment by terminal 120. In this design, the CDMA subsegment covers M=128 contiguous subcarriers and spans one frame of N=8 symbol periods. The CDMA subsegment thus covers L=M·N=1024 transmission units. Each transmission unit is one subcarrier in one symbol period and may be used to send one pilot symbol, which may be a real or complex value. A sequence of 1024 pilot symbols may be generated as described below and denoted as $\{p_0, p_1, p_2, \ldots, p_{1023}\}$. The first 128 pilot symbols in the sequence may be mapped to the 128 subcarriers in the first symbol period of the CDMA subsegment, the next 128 pilot symbols in the sequence may be mapped to the 128 subcarriers in the second symbol period of the CDMA subsegment, and so on, and the last 128 pilot symbols in the sequence may be mapped to the 128 subcarriers in the last symbol period of the CDMA subsegment. A reverse link signal may be generated with the pilot symbols mapped to the CDMA subsegment, as described below.

Terminal 120 may be assigned multiple CDMA subsegments by a single sector Y, e.g., the serving sector. These CDMA subsegments may be spread across frequency to allow sector Y to obtain pilot measurements for different frequency locations. Terminal 120 may send the same pilot sequence on each of the CDMA subsegments assigned to terminal 120. Alternatively, terminal 120 may generate a pilot sequence with a length determined by the number of assigned CDMA subsegments. In any case, sector Y may estimate the channel response of the reverse link for terminal 120 based on the pilot sent on the multiple CDMA subsegments.

In a time division duplexed (TDD) system, a single frequency channel is used for both the forward and reverse links, and the channel response of the forward link may correlate well with the channel response of the reverse link. In a frequency division duplexed (FDD) system, different frequency channels are used for the forward and reverse links, and the forward link channel response may not correlate well with the reverse link channel response. For a TDD system, sector Y may derive a forward link channel estimate for terminal 120 based on the reverse link channel estimate obtained from the pilot sent by terminal 120 on the multiple CDMA subsegments. Sector Y may then use the forward link channel estimate for beamforming to terminal 120 and/or for other purposes. For a TDD or FDD system, sector Y may use the reverse link channel estimate for subband scheduling of terminal 120. For subband scheduling, sector Y may determine the subband with the best reverse link channel gain and may assign time frequency resources in this subband to terminal 120.

Terminal 120 may generate the pilot sent on the CDMA segment such that the pilot is unique for terminal 120 among all terminals received by a given sector. This allows the sector to detect for the pilot from terminal 120. Furthermore, it may be desirable for terminal 120 to generate the pilot in the same manner across both space and time, so that the pilot is not sector specific. This would allow terminal 120 to send the same pilot even when terminal 120 moves about the system and is handed from sector to sector. This would also allow different sectors to receive the pilot from terminal 120. In one design, terminal 120 generates a scrambling sequence based on its pilot information and uses the scrambling sequence to generate the pilot. A sector may obtain this pilot information directly from terminal 120 via signaling or from another sector via the backhaul. The sector may be able to detect the pilot sent by terminal 120 on the CDMA segment based on the known pilot information for terminal 120.

In general, the pilot information may comprise any information that can uniquely identify terminal 120 at each sector that may receive the pilot from terminal 120. The pilot information may also be referred to as seed information, etc., and may comprise various types of information. In one design, the pilot information comprises an identifier of terminal 120, an identifier of a sector with which terminal 120 communicates to access the system (which is referred to as the access sector), and a system access time for terminal 120. The identifier of terminal 120 may be a Medium Access Control identifier (MAC ID) assigned to terminal 120 (e.g., during system access), an Internet Protocol (IP) address for terminal 120, or some other type of identifier for terminal 120. The identifier of the access sector may be a pseudo-random number code (AccessSectorPN) or some other type of identifier for the access sector. In the following description, the identifier of terminal 120 is referred to as MAC ID, and the identifier of the access sector is referred to as Sector ID. The system access time is the time at which terminal 120 accesses the system and may be given by a frame index, a superframe index, etc. In another design, the pilot information comprises the MAC ID and the Sector ID. In yet another design, the pilot information comprises the MAC ID and the system access time. The pilot information may also comprise other types of information that can ensure unique pilot information for terminal 120.

Figure 6:
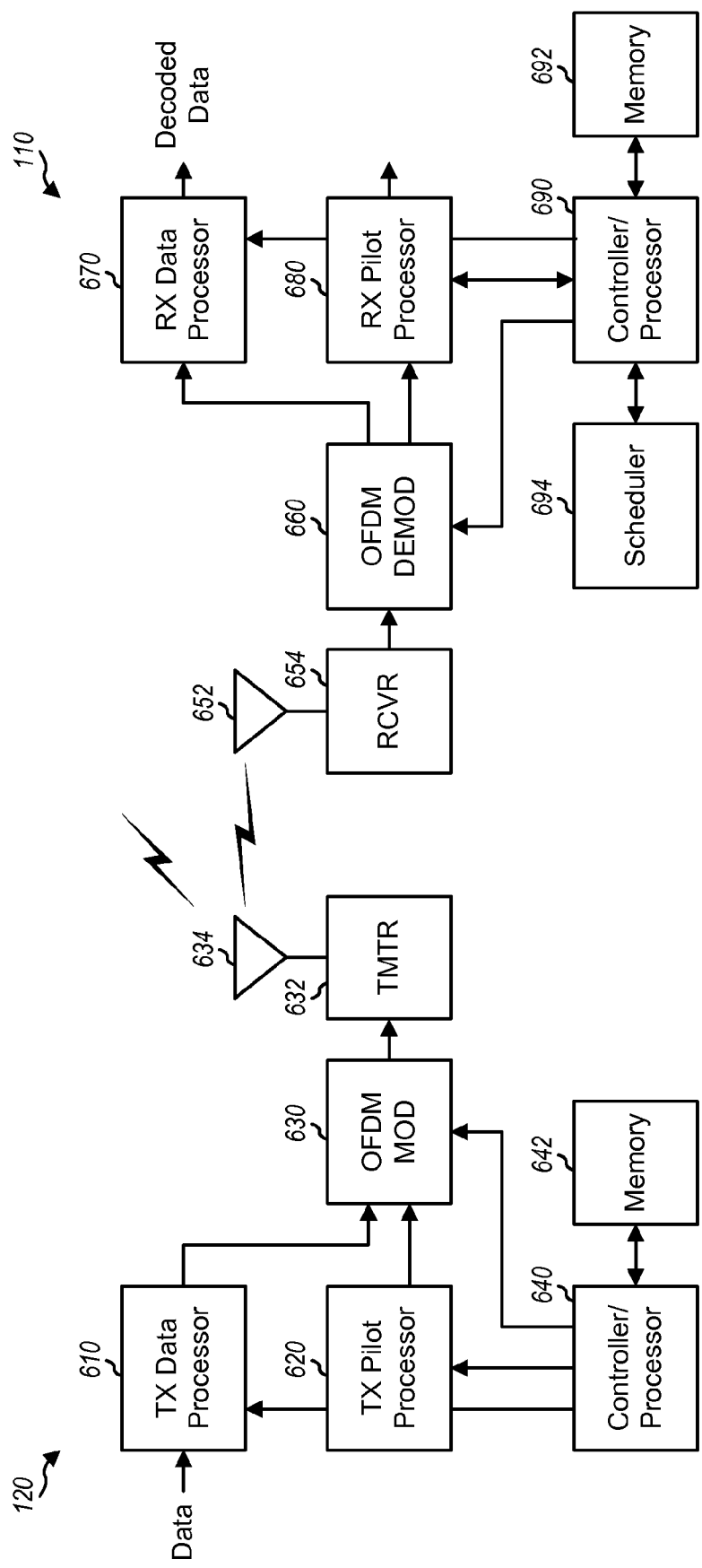
FIG. 6 shows a block diagram of a terminal and a base station.

FIG. 6 shows a block diagram of a design of terminal 120 and base station 110, which is one of the base stations in FIG. 1. For simplicity, only processing units for transmission on the reverse link are shown in FIG. 6. Also for simplicity, base station 110 and terminal 120 are each equipped with a single antenna.

At terminal 120, a transmit (TX) data processor 610 receives traffic data and signaling data, processes the received data, and provides data symbols. A TX pilot processor 620 generates pilot symbols for the CDMA segment. As used herein, a data symbol is a symbol for traffic or signaling data, a pilot symbol is a symbol for pilot data, a zero symbol is a symbol with a signal value of zero, and a symbol is typically a complex value. The data symbols may be modulation symbols from modulation schemes such as PSK, QAM, etc. Pilot data is data that is known a priori by both a transmitter and a receiver. An OFDM modulator (MOD) 630 performs OFDM modulation on the data and pilot symbols and provides output chips. OFDM modulator 630 may also be replaced with other types of modulator for other multiplexing schemes (e.g., SC-FDM) that may be used for the reverse link. A transmitter (TMTR) 632 processes (e.g., converts to analog, amplifies, filters, and upconverts) the output chips and generates a reverse link signal, which is transmitted via an antenna 634.

At base station 110, an antenna 652 receives the reverse link signals from terminal 120 and other terminals and provides a received signal to a receiver (RCVR) 654. Receiver 654 processes (e.g., filters, amplifies, downconverts, and digitizes) the received signal and provides received samples. An OFDM demodulator (DEMOD) 660 performs OFDM demodulation on the received samples to obtain received symbols, provides received symbols for the CDMA segment to a receive (RX) pilot processor 680, and provides remaining received symbols to an RX data processor 670. RX data processor 670 processes its received symbols in a manner complementary to the processing by TX data processor 610 and provides decoded data. RX pilot processor 680 processes its received symbols as described below and may provide information on received signal strength, timing, frequency error, and/or other parameters for each terminal communicating with base station 110.

Controllers 640 and 690 direct the operation at terminal 120 and base station 110, respectively. Memories 642 and 692 store program codes and data for terminal 120 and base station 110, respectively. Scheduler 694 may schedule terminal 120 and other terminals for transmission on the forward and/or reverse link.

In general, terminal 120 may be assigned one or more CDMA subsegments by a given sector. For simplicity, the following description assumes that terminal 120 is assigned one CDMA subsegment by each sector. In general, a sector may have one or more CDMA subsegments for its CDMA segment. For simplicity, the following description assumes that the CDMA segment for each sector includes one CDMA subsegment.

Figure 7:
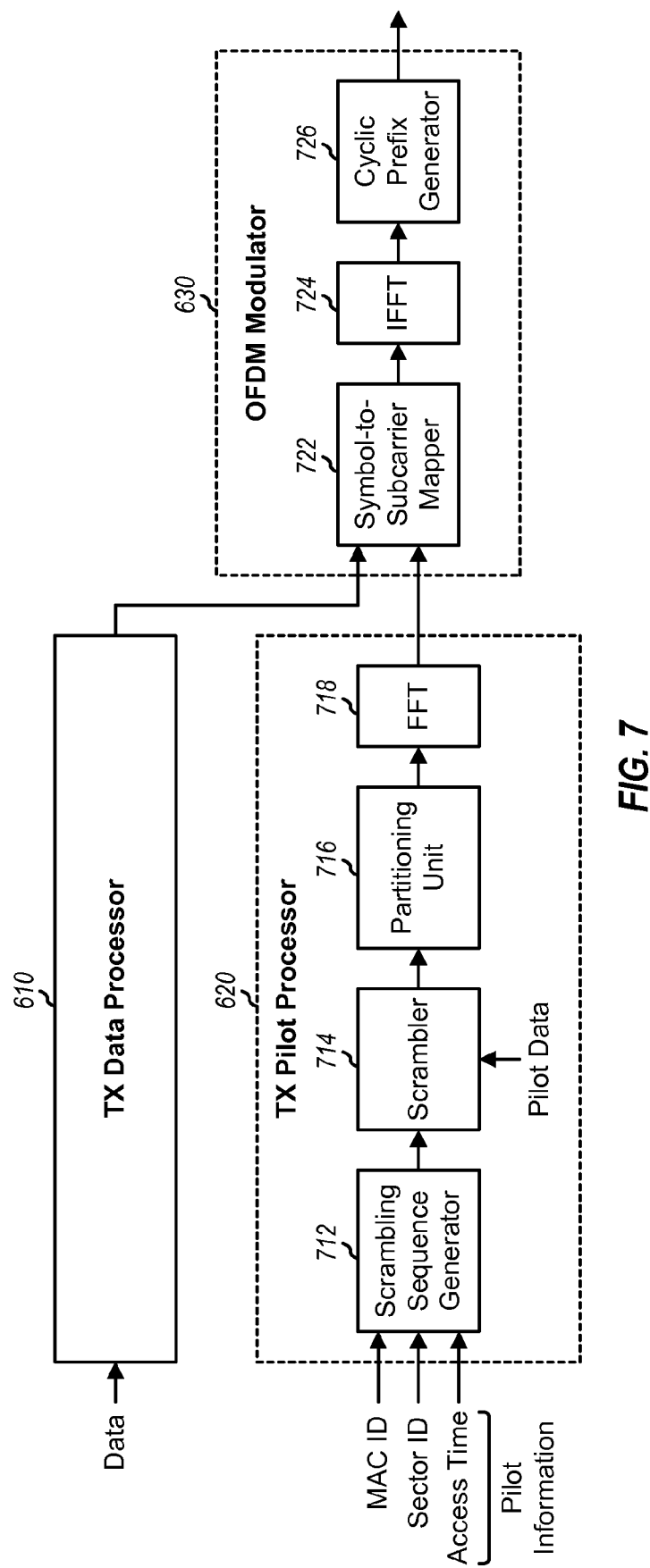
FIG. 7 shows a block diagram of a transmit pilot processor and a modulator.

FIG. 7 shows a block diagram of a design of TX pilot processor 620 and OFDM modulator 630 at terminal 120 in FIG. 6. Within TX pilot processor 620, a scrambling sequence generator 712 receives pilot information for terminal 120 and generates a scrambling sequence based on the pilot information. In one design, generator 712 is a PN generator that is seeded with the pilot information. In another design, generator 712 maps the pilot information to one scrambling sequence out of all possible scrambling sequences. In any case, the scrambling sequence may have a length determined by the length of the pilot sequence sent in the CDMA segment, e.g., L=1024.

A scrambler 714 receives and scrambles pilot data with the scrambling sequence and provides a scrambled sequence of L chips. Each chip may be a complex value in the time domain. The pilot data may be any known sequence, e.g., a sequence of all ones, a known PN sequence, etc. The scrambling may be achieved by performing chip-by-chip multiply of the pilot data with the scrambling sequence. A partitioning unit 716 partitions the scrambled sequence into N scrambled subsequences, one subsequence for each of the N symbol periods of a frame in which the CDMA segment is sent. Each scrambled subsequence includes M chips. In each symbol period of the CDMA segment, a fast Fourier transform (FFT) unit 718 performs an M-point FFT on the M chips in the scrambled subsequence for that symbol period and provides M pilot symbols for the symbol period.

Within OFDM modulator 630, a symbol-to-subcarrier mapper 722 receives the data symbols from TX data processor 610 and the pilot symbols from TX pilot processor 620. In each symbol period of the CDMA segment, mapper 722 maps the M pilot symbols for that symbol period to the M subcarriers used for the CDMA segment and maps data symbols and/or zero symbols to the K−M remaining subcarriers. In each symbol period without the CDMA segment, mapper 722 maps data symbols and/or zero symbols to the K total subcarriers. Mapper 722 provides K output symbols in each symbol period, where each output symbol may be a pilot symbol, a data symbol, or a zero symbol. In each symbol period, an inverse FFT (IFFT) unit 724 performs a K-point IFFT on K output symbols for the K total subcarriers to obtain K time-domain chips for a useful portion of an OFDM symbol. A unit 726 appends a cyclic prefix to the useful portion by copying the last C chips of the useful portion and appending these C chips to the front of the useful portion to obtain the OFDM symbol, where C is the cyclic prefix length. The OFDM symbol includes K+C chips and may be sent in one symbol period of K+C chip periods. OFDM modulator 630 may also perform windowing and/or other processing, which are not shown in FIG. 7 for simplicity.

FIG. 7 shows a design in which the pilot is sent using CDMA in the time domain. In another design, the pilot is sent using CDMA in the frequency domain. In this design, the L chips in the scrambled sequence from scrambler 714 may be mapped directly to the L transmission units in the CDMA segment, without going through FFT unit 718. The M scrambles chips for each symbol period are provided directly as the M pilot symbols for that symbol period.

A given sector may receive pilots from any number of terminals on the CDMA segment for that sector. The sector may have the pilot information for each terminal assigned to the CDMA segment, e.g., via signaling exchanged with the terminal or from another sector. The sector may detect for the pilot sent by each terminal based on the pilot information for that terminal.

Figure 8:
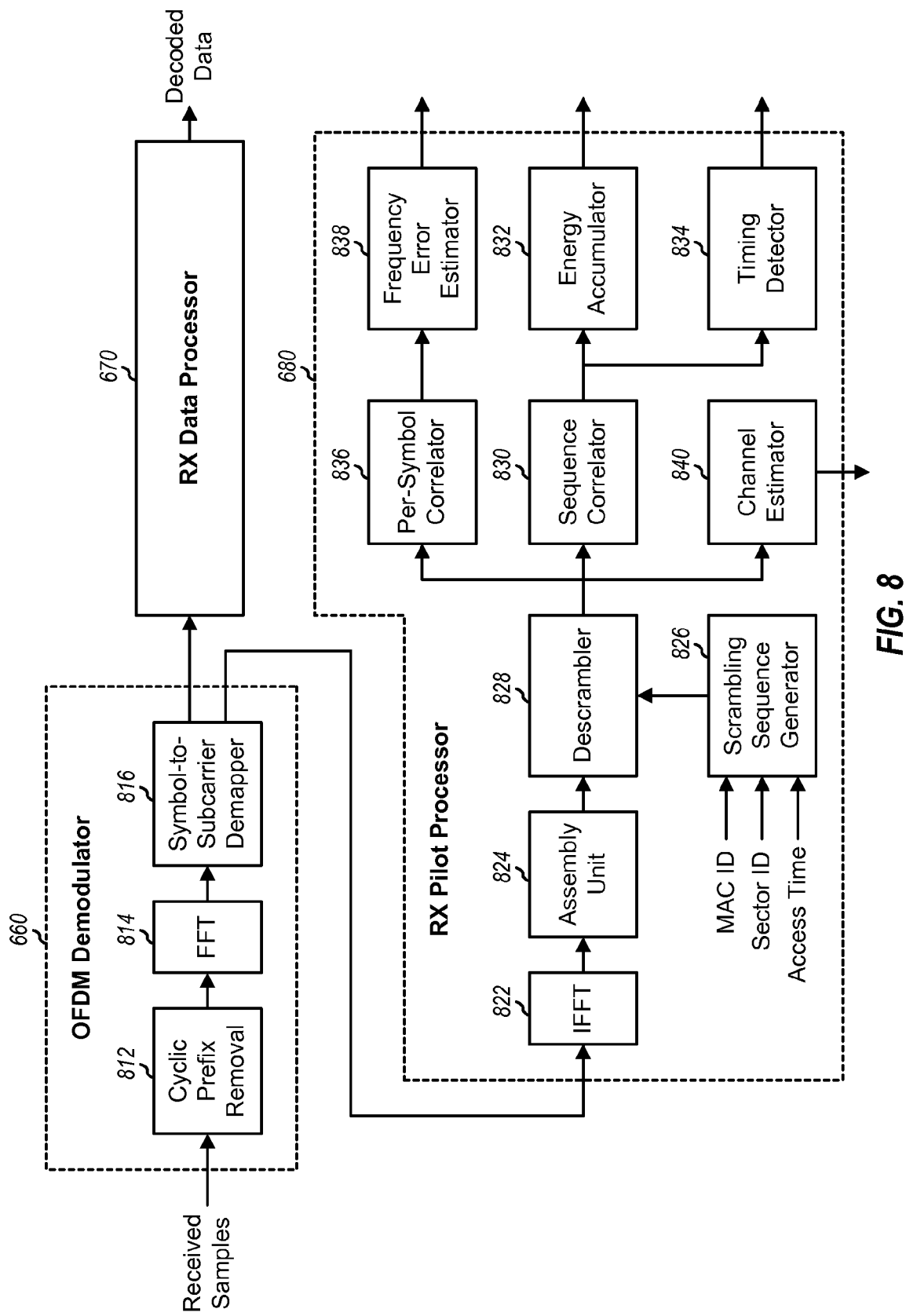
FIG. 8 shows a block diagram of a demodulator and a receive pilot processor.

FIG. 8 shows a block diagram of a design of OFDM demodulator 660 and RX pilot processor 680 at base station 110 in FIG. 6. OFDM demodulator 660 obtains received samples from receiver 654. In general, the sample rate may be equal to the chip rate or may be multiple (e.g., 2, 4, or 8) times the chip rate. For simplicity, the following description assumes that the sample rate is equal to the chip rate.

Within OFDM demodulator 660, a unit 812 obtains the received samples from receiver 654, removes the cyclic prefix in each received OFDM symbol, and provides K received samples for each symbol period. In each symbol period, an FFT unit 814 performs a K-point FFT on the K received samples for that symbol period and provides K received symbols for the K total subcarriers. OFDM demodulator 660 may also perform coherent detection on the received symbols with a channel estimate, which is not shown in FIG. 8 for simplicity. A symbol-to-subcarrier demapper 816 obtains the K received symbols for each symbol period, provides received symbols from the subcarriers used for the CDMA segment to RX pilot processor 680, and provides received symbols from the remaining subcarriers to RX data processor 670.

Within RX pilot processor 680, an IFFT unit 822 obtains received symbols for the CDMA segment. In each symbol period of the CDMA segment, IFFT unit 822 performs an M-point IFFT on M received symbols for that symbol period and provides M input samples. An assembly unit 824 receives the input samples for all N symbol periods of the CDMA segment and concatenates these input samples to obtain a base input sequence containing L input samples.

Base station 110 may receive the reverse link signal from terminal 120 via one or more signal paths, which may have different propagation delays. RX pilot processor 680 may perform processing for J channel taps in order to capture the energies of different signal paths from terminal 120 to base station 110. In general, J may be any integer value one or greater. J may be selected based on expected delay spread, which is the time difference between the earliest and latest signal paths, the chip rate, and/or other factors. For example, J may be equal to 8 for an expected delay spread of approximately 6 microseconds ($\mu s$) and a chip rate of 1.25 megachips/second (Mcps). The J channel taps may be spaced apart by one chip.

In one design, an input sequence for the j-th channel tap is obtained by cyclically shifting the base input sequence by j samples, where j=0, . . . , J−1. In another design, the input sequence for the j-th channel tap is obtained by shifting the base input sequence by j samples to the right, filling the first j sample positions with zeros, and discarding the last j samples. The input sequence for each channel tap may also be obtained in other manners. In any case, cyclic shift or linear shift may be performed on each of the N subsequences of length M. Assembly unit 824 provides the input sequence for each channel tap.

A scrambling sequence generator 826 receives the pilot information for terminal 120 and generates a scrambling sequence based on the pilot information. A descrambler 828 receives the input sequence for each channel tap from assembly unit 824 and the scrambling sequence from generator 826, descrambles the input sequence with the scrambling sequence, and provides a descrambled sequence. A correlator 830 correlates the descrambled sequence for each channel tap with the known pilot data, as follows:

$$C_j = \sum_{i=1}^{L} x_{i,j} \cdot d_i, \qquad \text{Eq (1)}$$

where $x_{i,j}$ is the i-th descrambled sample for the j-th channel tap,
  $d_i$ is the i-th chip of the pilot data, and
  $C_j$ is the correlation result for the j-th channel tap.
The descrambled samples $x_{i,j}$ may be multiplied with $d_i$ for real pilot data, as shown in equation (1), or with the complex conjugate of $d_i$ for complex pilot data, which is not in equation (1). If the pilot data is a Walsh sequence, then the correlation may be performed with a fast Hadamard transform (FHT) and taking the output corresponding to the pilot Walsh sequence.

An energy accumulator 832 accumulates the energies of all J channel taps, as follows:

$$E = \sum_{j=0}^{J-1} |C_j|^2, \qquad \text{Eq (2)}$$

where E is the received energy for all J channel taps for terminal 120. A normalization factor may be included in equation (2) if the pilot data sequence is not a unit energy sequence.

The received energy E may also be referred to as received signal strength, received pilot strength, etc. The received energy E may be indicative of the reverse link channel quality and may be used to schedule terminal 120 on the reverse link. The received energy E may also be used to adjust the transmit power of terminal 120.

The pilot sent on the CDMA segment may also be used for time tracking. It may be desirable to have the peak energy located at or near the center of the J channel taps. A timing detector 834 receives the correlation results for all J channel taps and determines the channel tap with the largest energy. A timing adjustment may be sent to terminal 120 so that the peak energy is at or near the center channel tap.

The pilot sent on the CDMA segment may also be used for frequency tracking. A correlator 836 correlates the M descrambled samples for each symbol period of the CDMA segment with the pilot data for that symbol period to obtain a complex value for the symbol period. Correlator 836 provides N complex values for the N symbol periods of the CDMA segment. A frequency error estimator 838 estimates the average phase change across the N symbol periods based on the N complex values and derives a frequency error estimate based on the average phase change. The frequency error for terminal 120 may be removed by rotating the received samples based on the frequency error estimate prior to OFDM demodulation. The frequency error may also be removed in other manners.

A channel estimator 840 may receive the descrambled sequence from descrambler 828 and the pilot data and may derive a reverse link channel estimate for terminal 120. For example, the channel estimates for different taps may be derived based on the $C_j$ values from equation (1) by appropriately scaling these value, e.g., with maximum likelihood (ML) or minimum mean square error (MMSE) estimates. The reverse link channel estimate may be used for coherent demodulation of signaling channels sent by terminal 120 on the CDMA segment.

FIG. 8 shows a design of RX pilot processing for the case in which the pilot is sent using CDMA in the time domain. If the pilot is sent using CDMA in the frequency domain, then unit 812 may use a sliding FFT window to select a different set of K received samples for each channel tap. In each symbol period, unit 812 may move the FFT window by one chip period for each channel tap and may provide the K received samples within the FFT window as the set of K received samples for that channel tap. Units 822, 824, and 828 may process the K received samples for each channel tap as described above to obtain the descrambled sequence for the channel tap.

The cyclic prefix length is typically selected based on (e.g., equal to or longer than) the expected delay spread. This would then allow the cyclic prefix to capture most of the energies in the signal paths from terminal 120 to base station 110. Base station 110 may also detect for the pilot from terminal 120 over a wider window in order to identify signal paths outside of the cyclic prefix length. In one design, this may be done similarly to the cyclic shift and linear shift procedures described above, albeit with a larger value of J. In another design, this may be done by constructing an actual time-domain equivalent of the transmitted pilot sequence (which may be obtained by inserting cyclic prefixes before each subsequence of length M) and correlating it with an actual received time-domain signal (which may be extracted from a wideband received signal, e.g., by using a sharp filter around the CDMA subsegment). In yet another design, a first time-domain sequence may be constructed from the scrambled pilot data and a second time-domain sequence may be constructed from the input sequence of length L, by inserting all-zero subsequences of length equivalent to the duration of the cyclic prefix before each subsequence of length M. Then, for each shift hypotheses, correlation may be obtained by first linearly shifting the first time-domain sequence and then correlating the linearly shifted sequence with the second time-domain sequence. Base station 110 may perform wider pilot detection periodically in order to reduce processing requirements.

FIG. 9 shows a design of a process 900 performed by a terminal to transmit pilot on the reverse link. A scrambling sequence may be generated based on pilot information for the terminal (block 912). The pilot information may be used for the entire duration of a call by the terminal and for all sectors with which the terminal communicates during the call. The pilot information may comprise an identifier of the terminal, an identifier of a sector with which the terminal communicates to access the system, a system access time for the terminal, some other information, or any combination thereof.

Pilot symbols may be generated based on the scrambling sequence for the terminal (block 914). The pilot symbols may be mapped to a time frequency block used for sending pilot on the reverse link (block 916). The time frequency block may comprise multiple subcarriers in multiple symbol periods and may occupy a portion of the time frequency resources available for transmission on the reverse link. The time frequency block may be for a CDMA segment used by terminals to send pilots on the reverse link using CDMA. The mapped pilot symbols may be sent on the reverse link to at least one sector in the system (block 918).

FIG. 10 shows a design of an apparatus 1000 for transmitting pilot on the reverse link. Apparatus 1000 includes means for generating a scrambling sequence based on pilot information for a terminal (module 1012), means for generating pilot symbols based on the scrambling sequence (module 1014), means for mapping the pilot symbols to a time frequency block used for sending pilot on the reverse link (module 1016), and means for sending the mapped pilot symbols on the reverse link to at least one sector in the system (module 1018).

FIG. 11 shows a design of a process 1100 performed by a terminal to send pilot on a CDMA segment using OFDM. Pilot data may be scrambled with a scrambling sequence for the terminal to obtain a sequence of scrambled data (block 1112). The sequence of scrambled data may be partitioned into multiple subsequences of scrambled data for multiple symbol periods of the CDMA segment, one subsequence for each symbol period (block 1114). Each subsequence of scrambled data may be transformed to the frequency domain to obtain pilot symbols for a corresponding symbol period (block 1116).

The pilot symbols for each symbol period may be mapped to multiple subcarriers used for the CDMA segment (block 1118). An OFDM symbol may be generated for each symbol period with the pilot symbols for that symbol period mapped to the multiple subcarriers of the CDMA segment (block 1120). OFDM symbols for the multiple symbol periods of the CDMA segment may be sent on the reverse link to at least one sector (block 1122).

The terminal may receive a power control command generated based on the pilot symbols sent by the terminal on the CDMA segment. The terminal may adjust its transmit power based on the power control command. The terminal may also receive a timing adjustment determined based on the pilot symbols sent by the terminal on the CDMA segment. The terminal may adjust its timing based on the timing adjustment. The terminal may receive an assignment of time frequency resources for data transmission on the reverse link, which may be determined based on the pilot symbols sent by the terminal on the CDMA segment. The terminal may send data on the time frequency resources in the assignment.

FIG. 12 shows a design of an apparatus 1200 for sending pilot on a CDMA segment using OFDM. Apparatus 1200 includes means for scrambling pilot data with a scrambling sequence for a terminal to obtain a sequence of scrambled data (module 1212), means for partitioning the sequence of scrambled data into multiple subsequences of scrambled data for multiple symbol periods of the CDMA segment, one subsequence for each symbol period (module 1214), means for transforming each subsequence of scrambled data to the frequency domain to obtain pilot symbols for a corresponding symbol period (module 1216), means for mapping the pilot symbols for each symbol period to multiple subcarriers used for the CDMA segment (module 1218), means for generating an OFDM symbol for each symbol period with the pilot symbols for that symbol period mapped to the multiple subcarriers of the CDMA segment (module 1220), and means for sending OFDM symbols for the multiple symbol periods of the CDMA segment on the reverse link to at least one sector (module 1222).

Figure 13:
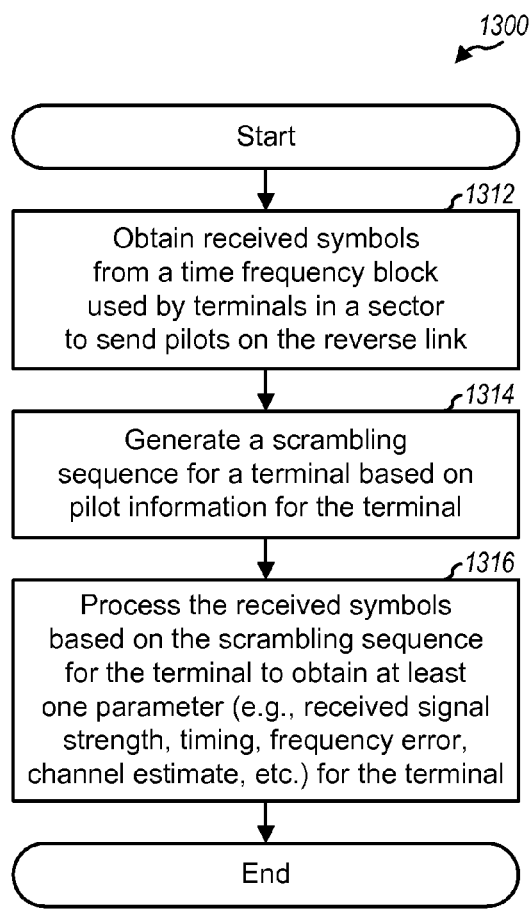
FIGS. 13 and 15 show processes to receive pilot from a terminal.

FIG. 13 shows a design of a process 1300 performed by a base station for a sector to receive pilot from a terminal. Received symbols from a time frequency block used by terminals in the sector to send pilots on the reverse link may be obtained (block 1312). The time frequency block may comprise multiple subcarriers in multiple symbol periods and may be for a CDMA segment for the sector. A scrambling sequence for the terminal may be generated based on pilot information for the terminal (block 1314). The received symbols may be processed based on the scrambling sequence for the terminal to obtain at least one parameter (e.g., received signal strength, timing, frequency error, channel estimate, etc.) for the terminal (block 1316).

Figure 14:
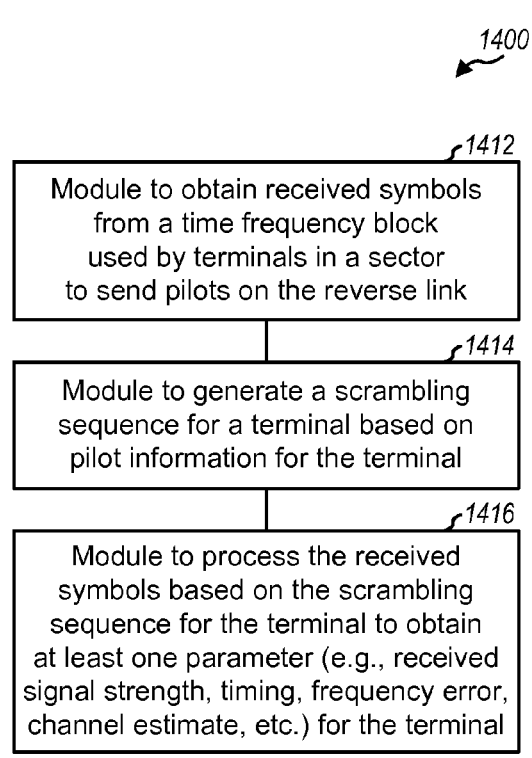
FIGS. 14 and 16 show apparatuses to receive pilot from a terminal.

FIG. 14 shows a design of an apparatus 1400 for receiving pilot from a terminal. Apparatus 1400 includes means for obtaining received symbols from a time frequency block used by terminals in a sector to send pilots on the reverse link (module 1412), means for generating a scrambling sequence for the terminal based on pilot information for the terminal (module 1414), and means for processing the received symbols based on the scrambling sequence for the terminal to obtain at least one parameter for the terminal (module 1416).

Figure 15:
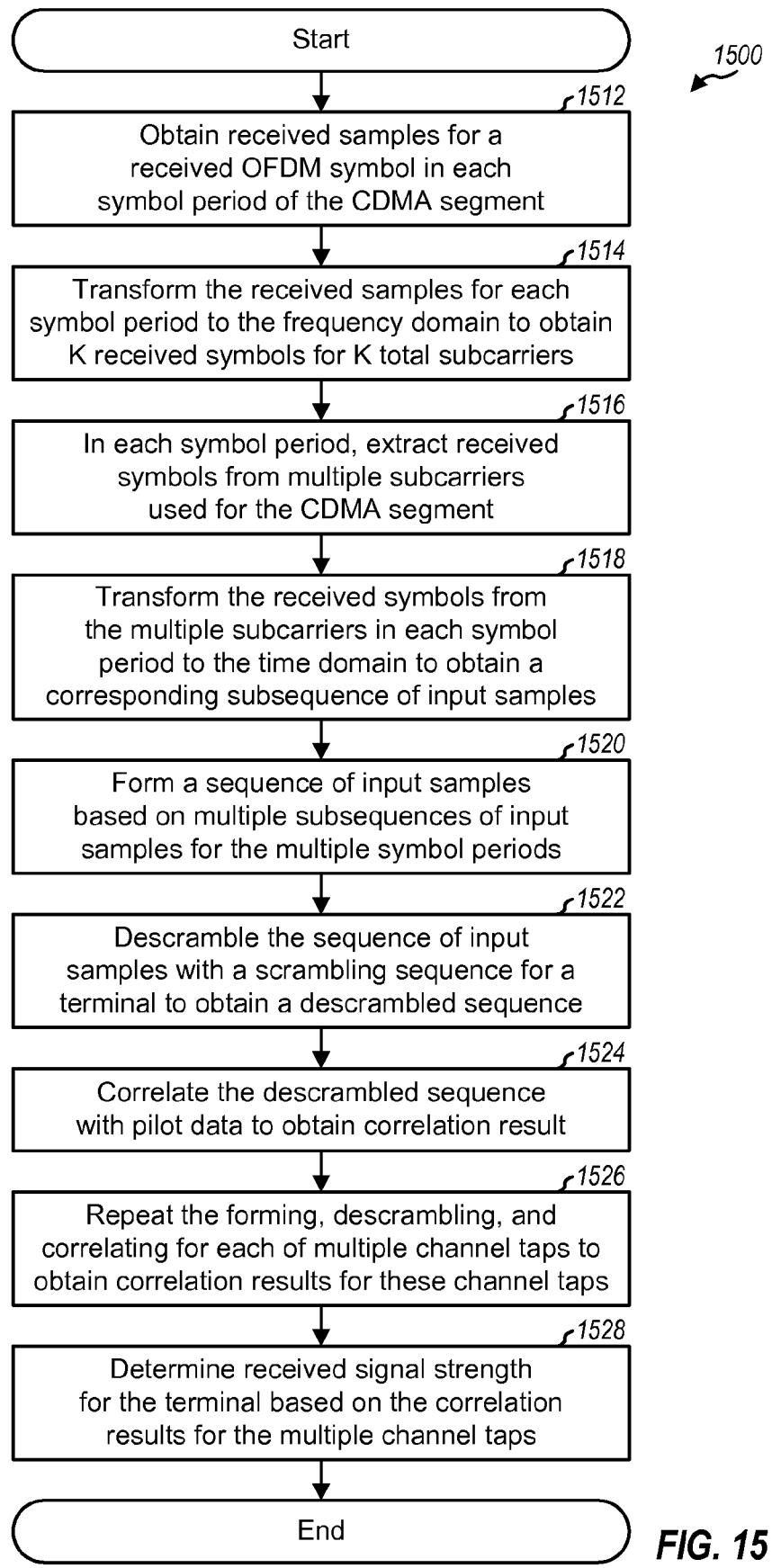

FIG. 15 shows a design of a process 1500 performed by a base station for a sector to receive pilot sent by a terminal on a CDMA segment using OFDM. Received samples for a received OFDM symbol in each symbol period of the CDMA segment may be obtained (block 1512). The received samples for each symbol period may be transformed to the frequency domain to obtain K received symbols for K total subcarriers (block 1514). For each symbol period, received symbols from multiple subcarriers used for the CDMA segment may be extracted (block 1516).

The received symbols from the multiple subcarriers in each symbol period may be transformed to the time domain to obtain a corresponding subsequence of input samples (block 1518). A sequence of input samples may be formed based on multiple subsequences of input samples obtained for the multiple symbol periods of the CDMA segment (block 1520). The sequence of input samples may be descrambled with a scrambling sequence for the terminal to obtain a descrambled sequence (block 1522). The descrambled sequence may be correlated with pilot data to obtain correlation result (block 1524). Blocks 1520, 1522 and 1524 may be repeated for each of multiple channel taps to obtain correlation results for these channel taps (block 1526). Received signal strength for the terminal may be determined based on the correlation results for the multiple channel taps (block 1528).

A power control command may be generated for the terminal based on the received signal strength and may be sent to the terminal. A timing adjustment for the terminal may be determined based on the correlation results for the multiple channel taps and may be sent to the terminal. A frequency error estimate may be derived based on multiple complex values obtained by correlating multiple descrambled subsequences for the multiple symbol periods with pilot data.

Figure 16:
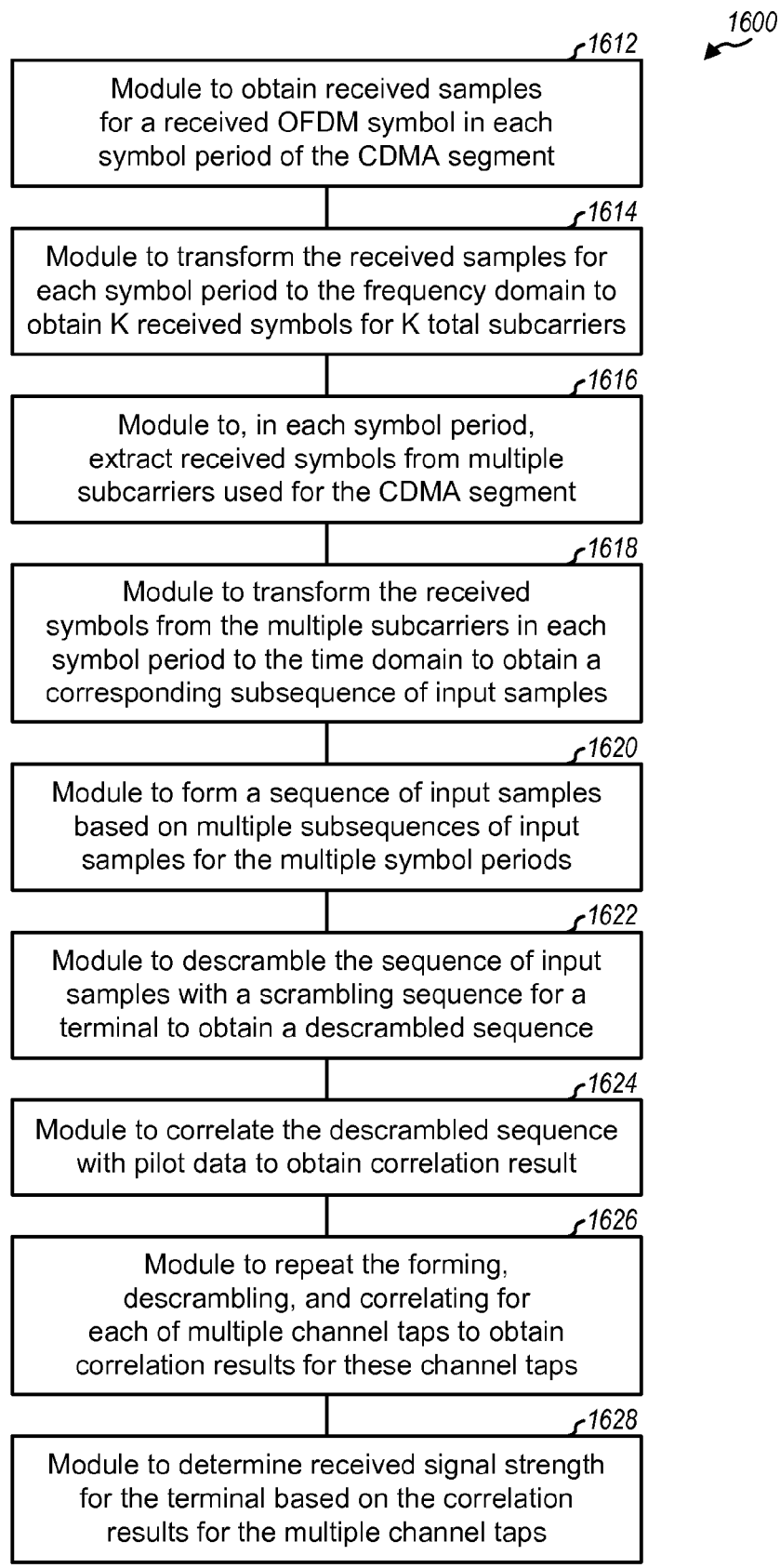

FIG. 16 shows a design of an apparatus 1600 for receiving pilot sent by a terminal on a CDMA segment using OFDM. Apparatus 1600 includes means for obtaining received samples for a received OFDM symbol in each symbol period of the CDMA segment (module 1612), means for transforming the received samples for each symbol period to the frequency domain to obtain K received symbols for K total subcarriers (module 1614), means for extracting received symbols from multiple subcarriers used for the CDMA segment in each symbol period in which the CDMA segment is sent (module 1616), means for transforming the received symbols from the multiple subcarriers in each symbol period to the time domain to obtain a corresponding subsequence of input samples (module 1618), means for forming a sequence of input samples based on multiple subsequences of input samples obtained for the multiple symbol periods of the CDMA segment (module 1620), means for descrambling the sequence of input samples with a scrambling sequence for the terminal to obtain a descrambled sequence (module 1622), means for correlating the descrambled sequence with pilot data to obtain correlation result (module 1624), means for repeating the forming, descrambling, and correlating for each of multiple channel taps to obtain correlation results for these channel taps (module 1626), and means for determining received signal strength for the terminal based on the correlation results for the multiple channel taps (module 1628).

FIG. 17 shows a design of a process 1700 performed by a terminal for sending pilot on the reverse link. Assignments of multiple CDMA segments may be received from multiple sectors, with the multiple CDMA segments being synchronized and overlapping in time and frequency (block 1712). The multiple CDMA segments may also hop across frequency over time based on a frequency hopping sequence that is common to the multiple sectors, e.g., as shown in FIG. 4. Pilot may be sent on the multiple CDMA segments to the multiple sectors (block 1714). For block 1714, pilot symbols may be mapped to a time frequency block used for the multiple CDMA segments. OFDM symbols may be generated with the mapped pilot symbols and sent to the multiple sectors.

FIG. 18 shows a design of an apparatus 1800 for sending pilot on the reverse link. Apparatus 1800 includes means for receiving assignments of multiple CDMA segments from multiple sectors, with the multiple CDMA segments being synchronized and overlapping in time and frequency (module 1812), and means for sending pilot on the multiple CDMA segments to the multiple sectors (module 1814).

FIG. 19 shows a design of a process 1900 performed by a terminal for sending pilot on the reverse link. Pilot information for the terminal may be determined, with the pilot information being used by all sectors with which the terminal communicates during a call to detect for pilot sent by the terminal on the reverse link (block 1912). The pilot information may comprise any of the information noted above and may be provided to each sector communicating with the terminal. A scrambling sequence may be generated based on the pilot information (block 1914). Pilot symbols may be generated based on the scrambling sequence (block 1916) and sent on the reverse link to at least one sector in the system (block 1918).

FIG. 20 shows a design of an apparatus 2000 for sending pilot on the reverse link. Apparatus 2000 includes means for determining pilot information for a terminal, with the pilot information being used by all sectors with which the terminal communicates during a call to detect for pilot sent by the terminal on the reverse link (module 2012), means for generating a scrambling sequence based on the pilot information (module 2014), means for generating pilot symbols based on the scrambling sequence (module 2016), and means for sending the pilot symbols on the reverse link to at least one sector in a wireless communication system (module 2018).

The modules in FIGS. 10, 12, 14, 16, 18 and 20 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units used to perform the techniques at an entity (e.g., a base station or a terminal) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 642 or 692 in FIG. 6) and executed by a processor (e.g., processor 640 or 690). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
at least one processor configured to:
generate a scrambling sequence based on pilot information for a terminal;
generate pilot symbols based on the scrambling sequence;
identify one or more code division multiple access (CDMA) subsegments assigned to the terminal by at least one sector, wherein the one or more CDMA subsegments comprise a set of subcarriers shared by terminals served by the at least one sector for sending control information on a reverse link in the wireless communication system, and wherein the set of subcarriers comprises a subset of a system bandwidth;
map the pilot symbols to a time frequency block of the one or more CDMA subsegments, the time frequency block covering a subset of time frequency resources of the one or more CDMA subsegments; and
send the mapped pilot symbols in the one or more CDMA subsegments on the reverse link to the at least one sector in a wireless communication system; and
a memory coupled to the at least one processor.

2. The apparatus of claim 1, wherein the time frequency block comprises multiple subcarriers in multiple symbol periods.

3. The apparatus of claim 1, wherein the set of subcarriers comprises subcarriers of a Code Division Multiple Access (CDMA) control segment.

4. The apparatus of claim 1, wherein the pilot information is used for an entire duration of a call by the terminal and for all sectors with which the terminal communicates during the call.

5. The apparatus of claim 2, wherein the at least one processor is configured to scramble pilot data with the scrambling sequence to obtain a sequence of scrambled data, to partition the sequence of scrambled data into multiple subsequences of scrambled data for the multiple symbol periods, one subsequence for each symbol period, and to transform each subsequence of scrambled data to frequency domain to obtain the pilot symbols for a corresponding symbol period.

6. The apparatus of claim 2, wherein for each of the multiple symbol periods, the at least one processor is configured to map the pilot symbols for the symbol period to the multiple subcarriers, and to generate an OFDM symbol for the symbol period with the pilot symbols mapped to the multiple subcarriers.

7. The apparatus of claim 1, wherein the at least one processor is configured to receive an assignment of multiple CDMA subsegments from a sector among the at least one sector, to map the pilot symbols to time frequency blocks of each of the multiple CDMA subsegments, and to send the mapped pilot symbols on the multiple CDMA subsegments to the sector.

8. The apparatus of claim 1, wherein the at least one processor is configured to receive a power control command generated based on the pilot symbols sent by the terminal on the time frequency block, and to adjust transmit power of the terminal based on the power control command.

9. The apparatus of claim 1, wherein the at least one processor is configured to receive a timing adjustment determined based on the pilot symbols sent by the terminal on the time frequency block, and to adjust timing of the terminal based on the timing adjustment.

10. The apparatus of claim 1, wherein the at least one processor is configured to receive an assignment of time frequency resources for data transmission on the reverse link, and to send data on the time frequency resources in the assignment.

11. A method for communication in a wireless system comprising:
generating a scrambling sequence based on pilot information for a terminal;
generating pilot symbols based on the scrambling sequence;
identifying one or more code division multiple access (CDMA) subsegments assigned to the terminal by at least one sector, wherein the one or more CDMA subsegments comprise a set of subcarriers shared by terminals served by the at least one sector for sending control information on a reverse link in the wireless communication system, and wherein the set of subcarriers comprises a subset of a system bandwidth;
mapping the pilot symbols to a time frequency block of the one or more CDMA subsegments, the time frequency block covering a subset of time frequency resources of the one or more CDMA subsegments; and
sending the mapped pilot symbols in the one or more CDMA subsegments on the reverse link to the at least one sector.

12. The method of claim 11, wherein the generating the pilot symbols comprises
scrambling pilot data with the scrambling sequence to obtain a sequence of scrambled data,
partitioning the sequence of scrambled data into multiple subsequences of scrambled data for multiple symbol periods of the time frequency block, one subsequence for each symbol period, and
transforming each subsequence of scrambled data to frequency domain to obtain the pilot symbols for a corresponding symbol period.

13. The method of claim 11, wherein the time frequency block comprises multiple subcarriers in multiple symbol periods,
wherein the mapping the pilot symbols comprises
mapping pilot symbols for each of the multiple symbol periods to the multiple subcarriers, and
wherein the sending the mapped pilot symbols comprises
generating an OFDM symbol for each symbol period with the pilot symbols for the symbol period mapped to the multiple subcarriers.

14. An apparatus comprising:
means for generating, by a processor, a scrambling sequence based on pilot information for a terminal;
means for generating pilot symbols based on the scrambling sequence;
means for identifying one or more code division multiple access (CDMA) subsegments assigned to the terminal by at least one sector, wherein the one or more CDMA subsegments comprise a set of subcarriers shared by terminals served by the at least one sector for sending control information on a reverse link in the wireless communication system, and wherein the set of subcarriers comprises a subset of a system bandwidth;
means for mapping the pilot symbols to a time frequency block of the one or more CDMA subsegments, the time frequency block covering a subset of time frequency resources of the one or more CDMA subsegments; and means for sending the mapped pilot symbols in the one or more CDMA subsegments on the reverse link to the at least one sector in a wireless communication system.

15. The apparatus of claim 14, wherein the means for generating the pilot symbols comprises means for scrambling pilot data with the scrambling sequence to obtain a sequence of scrambled data, means for partitioning the sequence of scrambled data into multiple subsequences of scrambled data for multiple symbol periods of the time frequency block, one subsequence for each symbol period, and means for transforming each subsequence of scrambled data to frequency domain to obtain the pilot symbols for a corresponding symbol period.

16. A non-transitory processor-readable medium including instructions stored thereon, comprising:
a first instruction set for generating a scrambling sequence based on pilot information for a terminal;
a second instruction set for generating pilot symbols based on the scrambling sequence;
a second instruction set for identifying one or more code division multiple access (CDMA) subsegments assigned to the terminal by at least one sector, wherein the one or more CDMA subsegments comprise a set of subcarriers shared by terminals served by the at least one sector for sending control information on a reverse link in the wireless communication system, and wherein the set of subcarriers comprises a subset of a system bandwidth;
a fourth instruction set for mapping the pilot symbols to a time frequency block of the one or more CDMA subsegments, the time frequency block covering a subset of time frequency resources of the one or more CDMA subsegments; and
a fifth instruction set for sending the mapped pilot symbols in the one or more CDMA subsegments on the reverse link to the at least one sector in a wireless communication system.

17. An apparatus comprising:
at least one processor configured to:
generate a scrambling sequence based on pilot information for a terminal;
assign, by at least one sector, one or more code division multiple access (CDMA) subsegments to the terminal, wherein the one or more CDMA subsegments comprise a set of subcarriers shared by terminals served by the at least one sector for sending control information on a reverse link in the wireless communication system, and wherein the set of subcarriers comprises a subset of a system bandwidth;
obtain received symbols from a time frequency block of the one or more CDMA subsegments, the time frequency block covering a subset of time frequency resources of the one or more CDMA subsegments; and
process the received symbols based on the scrambling sequence for the terminal to obtain at least one parameter for the terminal; and
a memory coupled to the at least one processor.

18. The apparatus of claim 17, wherein the time frequency block comprises multiple subcarriers in multiple symbol periods.

19. The apparatus of claim 17, wherein the set of subcarriers comprises subcarriers of a Code Division Multiple Access (CDMA) control segment.

20. The apparatus of claim 17, wherein the pilot information is used for an entire duration of a call by the terminal and for all sectors with which the terminal communicates during the call.

21. The apparatus of claim 18, wherein for each of the multiple symbol periods, the at least one processor is configured to obtain received samples in the symbol period, to transform the received samples to frequency domain to obtain received symbols for K total subcarriers, where K is an integer greater than one, and to extract received symbols from the multiple subcarriers for the time frequency block.

22. The apparatus of claim 18, wherein the at least one processor is configured to transform received symbols from the multiple subcarriers in each symbol period to obtain a corresponding subsequence of input samples for the symbol period, to form a sequence of input samples based on multiple subsequences of input samples for the multiple symbol periods, and to process the sequence of input samples with the scrambling sequence to obtain the at least one parameter for the terminal.

23. The apparatus of claim 17, wherein the at least one processor is configured to determine received signal strength for the terminal based on the received symbols.

24. The apparatus of claim 23, wherein the at least one processor is configured to generate a power control command for the terminal based on the received signal strength, and to send the power control command to the terminal.

25. The apparatus of claim 17, wherein the at least one processor is configured to determine a channel estimate for the terminal based on the received symbols.

26. The apparatus of claim 17, wherein the at least one processor is configured to determine a timing adjustment for the terminal based on the received symbols, and to send the timing adjustment to the terminal.

27. The apparatus of claim 17, wherein the at least one processor is configured to determine a frequency error estimate for the terminal based on the received symbols.

28. A method comprising:
generating a scrambling sequence based on of pilot information for a terminal;
assigning, by at least one sector, one or more code division multiple access (CDMA) subsegments to the terminal, wherein the one or more CDMA subsegments comprise a set of subcarriers shared by terminals served by the at least one sector for sending control information on a reverse link in the wireless communication system, and wherein the set of subcarriers comprises a subset of a system bandwidth;
obtaining received symbols from a time frequency block of the one or more CDMA subsegments, the time frequency block covering a subset of time frequency resources of the one or more CDMA subsegments; and
processing the received symbols based on the scrambling sequence for the terminal to obtain at least one parameter for the terminal.

29. The method of claim 28, wherein the time frequency block comprises multiple subcarriers in multiple symbol periods, and wherein the obtaining the received symbols from the time frequency block comprises, for each symbol period,
obtaining received samples in the symbol period,
transforming the received samples to frequency domain to obtain received symbols for K total subcarriers, where K is an integer greater than one, and
extracting received symbols from the multiple subcarriers for the time frequency block.

30. The method of claim 28, wherein the processing the received symbols comprises determining received signal strength for the terminal based on the received symbols.

31. The method of claim 28, wherein the processing the received symbols comprises determining a channel estimate for the terminal based on the received symbols.

32. An apparatus comprising:
means for generating, by a processor, a scrambling sequence based on pilot information for a terminal;
means for assigning one or more code division multiple access (CDMA) subsegments to the terminal, wherein the one or more CDMA subsegments comprise a set of subcarriers shared by terminals served by at least one sector for sending control information on a reverse link in the wireless communication system, and wherein the set of subcarriers comprises a subset of a system bandwidth;
means for obtaining received symbols from a time frequency block of the one or more CDMA subsegments, the time frequency block covering a subset of time frequency resources of the one or more CDMA subsegments; and
means for processing the received symbols based on the scrambling sequence to obtain at least one parameter for the terminal.

33. The apparatus of claim 32, wherein the time frequency block comprises multiple subcarriers in multiple symbol periods, and wherein the means for obtaining the received symbols from the time frequency block comprises, for each symbol period,
means for obtaining received samples in the symbol period,
means for transforming the received samples to frequency domain to obtain received symbols for K total subcarriers, where K is an integer greater than one, and
means for extracting received symbols from the multiple subcarriers for the time frequency block.

34. The apparatus of claim 32, wherein the means for processing the received symbols comprises
means for determining received signal strength for the terminal based on the received symbols.

35. A non-transitory processor-readable medium including instructions stored thereon, comprising:
a first instruction set for generating a scrambling sequence based on pilot information for a terminal;
a second instruction set for assigning, by at least one sector, one or more code division multiple access (CDMA) subsegments to the terminal, wherein the one or more CDMA subsegments comprise a set of subcarriers shared by terminals served by the at least one sector for sending control information on a reverse link in the wireless communication system, and wherein the set of subcarriers comprises a subset of a system bandwidth;
a third instruction set for obtaining received symbols from a time frequency block of the one or more CDMA subsegments, the time frequency block covering a subset of time frequency resources of the one or more CDMA subsegments; and
a fourth instruction set for processing the received symbols based on the scrambling sequence to obtain at least one parameter for the terminal.

36. The processor-readable medium of claim 35, wherein the second instruction set comprises:
a fourth instruction set for determining received signal strength for the terminal based on the received symbols.

37. The apparatus of claim 1, wherein the at least one processor is configured to:
generate at least one Single-Carrier Frequency Division Multiple Access (SC-FDMA) symbol based on the pilot symbols, and send the at least one SC-FDMA symbol in the one or more CDMA subsegments on the reverse link to the at least one sector.

38. The method of claim 11, further comprising:
generating at least one Single-Carrier Frequency Division Multiple Access (SC-FDMA) symbol based on the pilot symbols,
wherein the sending the mapped pilot symbols comprises sending the at least one SC-FDMA symbol in the one or more CDMA subsegments on the reverse link to the at least one sector.

39. The apparatus of claim 1, wherein the one or more CDMA subsegments are assigned by multiple sectors.

40. The apparatus of claim 1, wherein the at least one processor is further configured to send the same pilot on the one or more CDMA subsegments.

41. The method of claim 11, wherein the one or more CDMA subsegments are assigned by multiple sectors.

42. The method of claim 11, wherein the sending comprises:
sending the same pilot on the one or more CDMA subsegments.

43. The apparatus of claim 14, wherein the one or more CDMA subsegments are assigned by multiple sectors.

44. The apparatus of claim 14, wherein the means for sending sends the same pilot on the one or more CDMA subsegments.

45. The apparatus of claim 14, further comprising:
means for generating at least one Single-Carrier Frequency Division Multiple Access (SC-FDMA) symbol based on the pilot symbols,
wherein the means for sending the mapped pilot symbols sends the at least one SC-FDMA symbol in the one or more CDMA subsegments on the reverse link to the at least one sector.

46. The non-transitory processor-readable medium of claim 16, further comprising:
a sixth instruction set for generating at least one Single-Carrier Frequency Division Multiple Access (SC-FDMA) symbol based on the pilot symbols,
a seventh instruction set for sending the at least one SC-FDMA symbol in the one or more CDMA subsegments on the reverse link to the at least one sector.

* * * * *